(12) United States Patent  
Matsubara et al.

(10) Patent No.: US 8,589,381 B2  
(45) Date of Patent: Nov. 19, 2013

(54) RESOURCE MANAGEMENT PROGRAM, RESOURCE MANAGEMENT PROCESS, AND RESOURCE MANAGEMENT APPARATUS

(75) Inventors: Masazumi Matsubara, Kawasaki (JP); Akira Katsuno, Kawasaki (JP); Hiroshi Yazawa, Kawasaki (JP); Takashi Fujiwara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 776 days.

(21) Appl. No.: 11/798,339

(22) Filed: May 11, 2007

(65) Prior Publication Data

US 2007/0288512 A1 Dec. 13, 2007

Related U.S. Application Data

(63) Continuation of application No. PCT/JP2004/016843, filed on Nov. 12, 2004.

(51) Int. Cl.
*G06F 7/00* (2006.01)
*G06F 9/46* (2006.01)

(52) U.S. Cl.
USPC ............................ 707/713; 707/718; 718/105

(58) Field of Classification Search
USPC ............... 707/705, 718, 769, 999.1, 999.204, 707/708, 713, 782; 718/105
See application file for complete search history.

(56) References Cited

U.S. PATENT DOCUMENTS

| | | | |
|---|---|---|---|
| 5,355,484 A | | 10/1994 | Record et al. |
| 6,157,927 A | | 12/2000 | Schaefer et al. |
| 6,529,932 B1 * | 3/2003 | Dadiomov et al. ........... 718/101 |
| 6,738,971 B2 * | 5/2004 | Chandrasekaran et al. .. 718/100 |
| 7,058,968 B2 * | 6/2006 | Rowland et al. ................... 726/1 |
| 7,337,242 B1 | 2/2008 | Motoyama et al. |
| 7,543,297 B2 * | 6/2009 | Srinivasa ....................... 718/106 |
| 7,707,141 B1 * | 4/2010 | Outhred et al. ............... 707/713 |
| 2002/0032783 A1 * | 3/2002 | Tuatini ........................... 709/229 |
| 2002/0065846 A1 * | 5/2002 | Ogawa et al. ................. 707/503 |
| 2003/0018830 A1 * | 1/2003 | Chen et al. ..................... 709/328 |
| 2005/0071751 A1 * | 3/2005 | Brodd et al. ................... 715/503 |

FOREIGN PATENT DOCUMENTS

| | | |
|---|---|---|
| EP | 1 078 316 B | 7/2003 |
| JP | 2002-512400 | 4/2002 |
| JP | 2003-248636 | 9/2003 |
| WO | 99/54817 | 10/1999 |

OTHER PUBLICATIONS

Patent Abstracts of Japan, Japanese Publication No. 10-011347 Published Jan. 16, 1998.

(Continued)

*Primary Examiner* — Robert Timblin
(74) *Attorney, Agent, or Firm* — Staas & Halsey LLP

(57) ABSTRACT

In order to enable hierarchized resource-managing functions to mutually request processing and maintain the uniqueness of processing performed by each of the resource-managing functions, a process is performed as follows. When a first action request is inputted, an action-handler search unit analyzes the request condition indicated in the first action request, and searches an action-handler table for an action handler corresponding to the request condition. An action execution unit starts the action handler detected by the action-handler search unit and performs processing defined in the started action handler. In the case where all or part of the processing requested by the first action request is not performed by the action execution unit, the action execution unit produces and transmits a second action request indicating a request condition of all or the part of the processing in a common data form.

8 Claims, 27 Drawing Sheets

(56) References Cited

OTHER PUBLICATIONS

Patent Abstracts of Japan, Japanese Publication No. 2003-157178 Published May 30, 2003.

Patent Abstracts of Japan, Japanese Publication No. 2003-248636 Published Sep. 5, 2003.
International Search Report of the International Published Application No. PCT/JP2004/016843 (mailed Feb. 22, 2005).
Japanese Office Action in JP 2006-544704, mailed Mar. 31, 2009.

* cited by examiner

103 LOG DB

| Operation Type | Log Information |
| --- | --- |
| Produce Action Request (Processing Before Transfer) | Request Condition (Original Request Condition) |
| Transmit Action Request | Request ID, Destination |
| Receive Action Request | Request ID, Sender |
| Execute Action | Request ID, Action ID |

FIG. 12

121a ACTION-HANDLER TABLE

| Target Type | Property | Action | Details of Execution |
|---|---|---|---|
| Server | Power Status | set | powerctl |
| Server Domain | Configuration | set | svrdomainctl.sh |
| Server Domain | Configuration | get | svrdomainctl.sh |

FIG. 14

131a ACTION-HANDLER TABLE

141a ACTION-HANDLER TABLE

| Target Type | Property | Action | Details of Execution |
|---|---|---|---|
| Software | State | get | swctl |
| Software | State | set | swctl |

FIG. 16

81 Action Request

```
<?xml version="1.0" ?>
<ActionRequest id="aq1" createDte="2004-08-24T12:00:00">
  <Creator name="systemRM211" id=SysRM2"/>
  <Sender name="systemRM211" id=SysRM2"/>

<!--acquire server-list information on available servers-->
  <GetAction id="action 1" sync="false">
    <Target site="Site1" class="ServerDomain" name="ServerPool" id="svcpool">
      <Structure key="FreeServerList"/>
    </Target>
  </GetAction>

</ActionRequest>
```

FIG. 21

82 Action Request

```
<?xml version="1.0" ?>
<ActionRequest id="aq2" createDte="2004-08-24T12:00:00">
  <Creator name="systemRM211" id=SysRM1"/>
  <Sender name="systemRM111" id=SysRM1"/>

<!--acquire server-list information on available servers-->
  <GetAction id="action 1" sync="false">
    <Target site="Site1" class="ServerDomain" name="ServerPool" id="svcpool">
      <Structure key="FreeServerList"/>
    </Target>
  </GetAction>

</ActionRequest>
```

FIG. 22

91 ACTION REQUEST

```
<?xml version="1.0" ?>
<ActionRequest id="aq3" createDate="2004-08-24T12:00:10">
  <Creator name= "systemRM211" id=SysRM1"/>
  <Sender name= "systemRM211" id=SysRM1"/>

<!--newly assign server to currently operating service-->
  <SetAction id="action 2" sync="false">
    <Target site="Site1" class="Service" name="Service 1" id="svc1">
      <Structure uri="file://node1/conf/service1_reconfig.xml"/>
    </Target>
  </SetAction>

</ActionRequest>
```

FIG. 24

92 ACTION REQUEST

```
<?xml version="1.0" ?>
<ActionRequest id="aq4" createDte="2004-08-24T12:00:10">
  <Creator name= "systemRM111" id=SysRM2"/>
  <Sender name= "systemRM111" id=SysRM2"/>

<!--change settings for VLAN in network device-->
  <SetAction id="action5" sync="false">
    <Target site="Site1" class="Network" name="Network 1" id="nw1">
      <Structure uri="file:///conf/network_setup1.xml"/>
    </Target>
  </SetAction>

</ActionRequest>
```

FIG. 25

93 ACTION REQUEST

```
<?xml version="1.0" ?>
<ActionRequest id="aq5" createDte="2004-08-24T12:00:20">
    <Creator name="systemRM111" id=SysRM2"/>
    <Sender name="systemRM111" id=SysRM2"/>

<!--start application in server-->
    <SetAction id="action6" sync="false">
      <Target site="Site1" class="Server" name="Server 1" id="svr1">
        <InternalState key="Service" value="start"/>
      </Target>
    </SetAction>

</ActionRequest>
```

FIG. 26

94 ACTION REQUEST

```
<?xml version="1.0" ?>
<ActionRequest id="aq6" createDte="2004-08-24T12:00:21">
  <Creator name="systemRM111" id=SysRM2"/>
  <Sender name= "serverRM121" id=SvrRM1"/>

<!--start application in server-->
  <SetAction id="action6" sync="false">
   <Target site="Site1" class="Server" name="Server 1" id="svr1">
     <InternalState key="Service" value="start"/>
   </Target>
  </SetAction>

</ActionRequest>
```

FIG. 27

RESOURCE MANAGEMENT PROGRAM, RESOURCE MANAGEMENT PROCESS, AND RESOURCE MANAGEMENT APPARATUS

This application is a continuing application, filed under 35 U.S.C. §111(a), of International Application PCT/JP2004/016843, filed Nov. 12, 2004.

BACKGROUND OF THE INVENTION

1. Field of the Invention

The present invention relates to a resource management program, resource management process, and resource management apparatus for managing IT (Information Technology) resources including hardware resources and software resources, and in particular, to a resource management program, resource management process, and resource management apparatus which can operate in liaison with other management systems.

2. Description of the Related Art

Currently, the software called the resource manager is widely used for managing IT resources including hardware resources and software resources in data centers and the like in order to reduce manual operations. In many cases, the resource manager can manage more than one resource in an integrated manner. However, the manner of managing resources is different in each type of resources. Therefore, the type of resources which can be managed by each resource manager is limited. Consequently, in the systems containing various types of resources, the resources in the entire systems are managed by a plurality of resource managers.

Further, as the functions of the respective resources are advanced, it becomes more common to manage each resource by using a dedicated resource manager. For example, a resource manager is provided for each of hardware elements such as servers, storages, and networks, or a unique resource manager is provided for each of product manufacturers. From the viewpoint of optimum use of the unique functions of resources, it is natural that the trend to provide the resource managers as above is accelerated.

In the case where a plurality of resource managers operate in a system, and various operations such as changes in the configuration of resources affect a wide area of the system, the resource managers are required to operate in cooperation.

However, the interface through which messages are transferred to and from the outside of the system is generally different for each resource manager. Therefore, it is difficult to make a plurality of resource managers operate in liaison with each other. For example, even if a server and a storage are newly introduced into the system, it is impossible to interconnect the resource manager for the server and the resource manager for the storage, so that the administrator is required to manually and independently make environment settings of the resource manager for the server and the resource manager for the storage. Consequently, a trouble is likely to occur and impede the service operation. For example, the trouble is that an erroneous setting impedes correct connection of the resource manager for the server and the resource manager for the storage.

Therefore, system operation by use of a plurality of resource managers produced on the basis of different architectures is necessary in a heterogeneous environment in which such resource managers coexist. In other words, a communication technique for interconnecting a plurality of dedicated resource managers is necessary, where each of the resource managers is designed to communicate with a resource to be managed by the resource manager by using an unique protocol.

For example, according to a known technique, a difference between interfaces is absorbed by using an agent arranged between a manager and a resource manager. According to this technique, a standard protocol is used in communication between the manager and the agent, and the agent receives a request for an operation, and converts the request into an unique command for use in the resource manager, in order to reduce development burden and improve maintainability. (See, for example, Japanese Unexamined Patent Publication No. 10-11347.)

However, the technique of converting the command by using an agent cannot be used in a system in which a plurality of resource managers coexist, and each of the resource managers performs communication in accordance with an unique protocol. In such a case, an agent corresponding to each resource manager is required to cope with all the protocols corresponding to the other resource managers. Nevertheless, from the viewpoint of the efficiency in system administration, it is difficult to update the agents corresponding to all the existing resource managers every time a new resource manager which performs communication in accordance with an unique protocol is added.

In particular, it is expected that the integrated management and operation extend over a plurality of sites in a company, a plurality of companies, or the entire world through a grid or the like in the future. Therefore, resource management of a large-scale system is required to be performed by hierarchizing resource managers. In the above circumstances, it is desired that mutual connectivity between resources be ensured in a hierarchized heterogeneous environment.

SUMMARY OF THE INVENTION

The present invention is made in view of the above problems, and an object of the present invention is to provide a resource management program, a resource management process, and a resource management apparatus which allows each of hierarchized resource-managing functions to request another of the hierarchized resource-managing functions to perform processing while maintaining the uniqueness of processing in each of the resource-managing functions.

To accomplish the above object, the present invention provides a computer-readable medium which stores a resource management program managing resources by sharing processing loads with one or more external resource-managing functions, and realizing in a computer: a storage unit which stores an action-handler table, in which an action handler is registered for each request condition, and details of at least a portion of processing corresponding to said each request condition are defined in the action handler; an action-handler search unit which analyzes a request condition indicated in a common data form in a first action request, and searches the action-handler table for an action handler corresponding to the request condition indicated in the first action request, on receipt of the first action request, where the common data form is shared with one or more external resource-managing functions; and an action execution unit which starts the action handler detected by the action-handler search unit and performs processing defined in the action handler detected by the action-handler search unit; wherein in a case where all or part of the processing requested to be performed by the first action request is not performed by the action execution unit, the action execution unit produces a second action request indicating a request condition of the all or part of the processing in the common data form, and transmits the second action request to one of the one or more external resource-managing functions which manages a device on which the all or part of the processing is to be performed.

Also, to accomplish the above object, the present invention provides a resource management process for managing resources by sharing processing loads with one or more external resource-managing functions, comprising the steps of: storing in advance, in a storage unit, an action-handler table, where an action handler is registered in the action-handler table for each request condition, and details of at least a portion of processing corresponding to the each request condition are defined in the action handler; analyzing, by an action-handler search unit, a request condition indicated in a common data form in a first action request, and searching the action-handler table for an action handler corresponding to the request condition indicated in the first action request, on receipt of the first action request, where the common data form is shared with one or more external resource-managing functions; starting, by an action execution unit, the action handler detected by the action-handler search unit and performing processing defined in the action handler detected by the action-handler search unit; and producing, by the action execution unit, a second action request indicating in the common data form all or part of the processing requested to be performed by the first action request which is not performed by the action execution unit, and transmitting the second action request to one of the one or more external resource-managing functions which manages a device on which the all or part of the processing is to be performed.

Further, to accomplish the above object, the present invention provides a resource management apparatus for managing resources by sharing processing loads with one or more external resource-managing functions, comprising: a storage unit which stores an action-handler table, in which an action handler is registered for each request condition, and details of at least a portion of processing corresponding to the each request condition are defined in the action handler; an action-handler search unit which analyzes a request condition indicated in a common data form in a first action request, and searches the action-handler table for an action handler corresponding to the request condition indicated in the first action request, on receipt of the first action request, where the common data form is shared with one or more external resource-managing functions; and an action execution unit which starts the action handler detected by the action-handler search unit and performs processing defined in the action handler detected by the action-handler search unit; wherein in a case where all or part of the processing requested to be performed by the first action request is not performed by the action execution unit, the action execution unit produces a second action request indicating a request condition of the all or part of the processing in the common data form, and transmits the second action request to one of the one or more external resource-managing functions which manages a device on which the all or part of the processing is to be performed.

The above and other objects, features and advantages of the present invention will become apparent from the following description when taken in conjunction with the accompanying drawings which illustrate preferred embodiment of the present invention by way of example.

BRIEF DESCRIPTION OF THE DRAWINGS

FIG. 12 is a diagram illustrating an example of a data structure of a log DB.

FIG. 14 is a diagram illustrating an example of an action-handler table stored in a management-server computer which manages servers.

FIG. 16 is a diagram illustrating an example of an action-handler table stored in a lower-level management-server computer which can provide web services.

FIG. 21 is a diagram indicating an example of an action request which is first outputted during the sequence for acquiring the information on server configuration.

FIG. 22 is a diagram indicating an example of an action request transferred from a system RM.

FIG. 24 is a diagram indicating an example of an action request which is first outputted for adding the server.

FIG. 25 is a diagram indicating an example of an action request transferred from a system RM.

FIG. 26 is a diagram indicating an example of an action request transferred from a system RM.

FIG. 27 is a diagram indicating an example of an action request transferred from a system RM.

DESCRIPTION OF THE PREFERRED EMBODIMENTS

Hereinbelow, an embodiment of the present invention is explained below with reference to drawings. First, an outline of the present invention which is realized in the embodiment is indicated, and thereafter details of the embodiment are explained.

Figure 1:
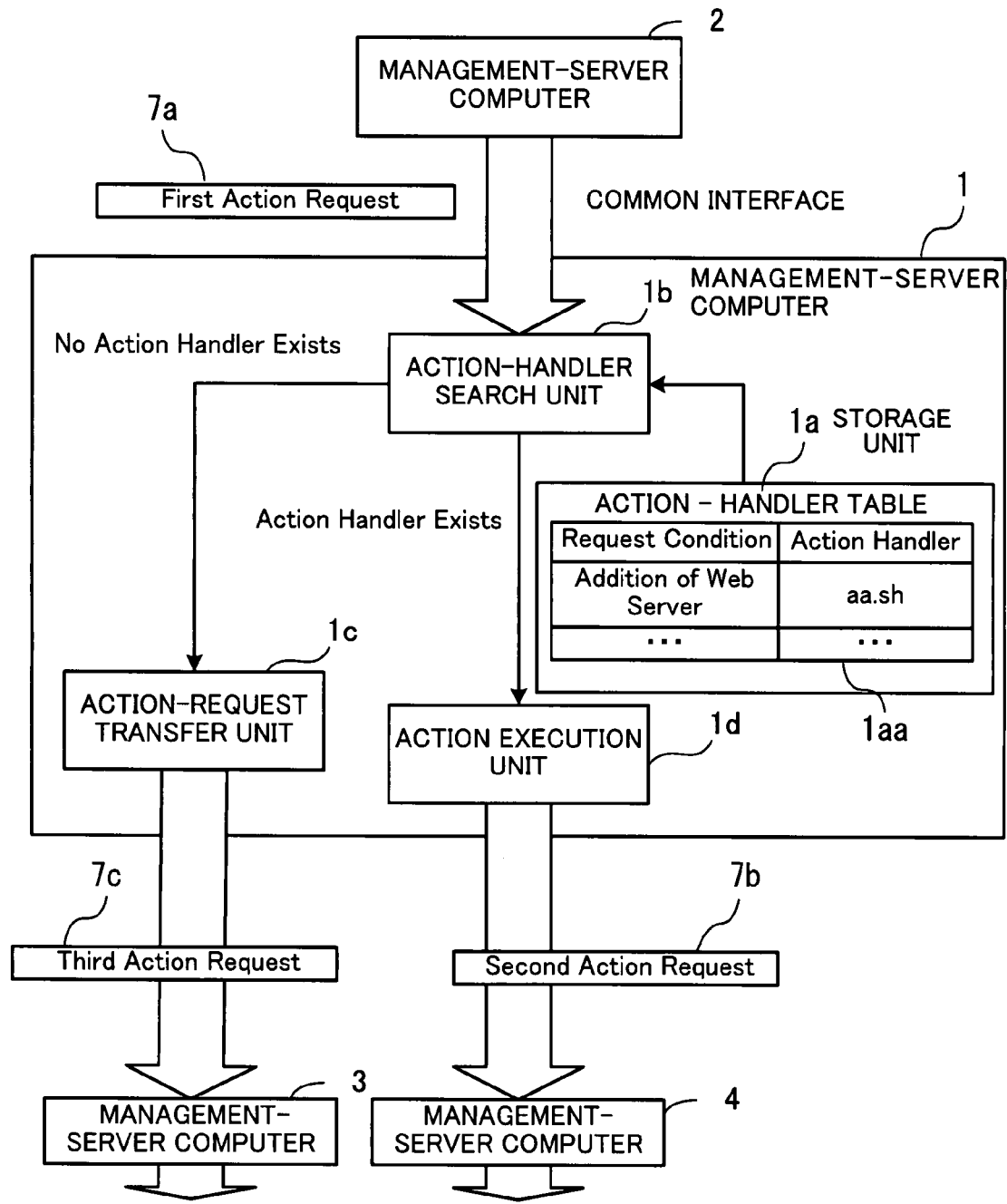
FIG. 1 is a conceptual diagram illustrating the present invention which is realized in an embodiment.

FIG. 1 is a conceptual diagram illustrating the present invention which is realized in an embodiment. In FIG. 1, the resource management program according to the present invention is installed in the management-server computers 1, 2, 3, and 4.

The storage unit 1a stores the action-handler table 1aa, in which an action handler is registered for each different request condition. In the action handler corresponding to each request condition, details of at least a portion of processing corresponding to the request condition are defined.

When the action-handler search unit 1b receives from another (an external) resource-managing function (i.e., a resource-managing function in the management-server computer 2 in the example of FIG. 1) a first action request 7a indicating a request condition of requested processing in a common data form (format) which is shared with one or more external resource-managing functions, the action-handler search unit 1b analyzes the request condition of the requested processing which is contained in the received first action request 7a, and then searches the action-handler table 1aa for an action handler corresponding to the request condition which is indicated in the received first action request 7a.

The action execution unit 1d starts the action handler detected by the action-handler search unit 1b, and performs the processing defined in the action handler. In the case where all or part of the requested processing which is indicated in the first action request 7a is not performed in the management-server computer 1, the action execution unit 1d produces a second action request 7b indicating in the common data form a request condition of all or the part of the requested processing which is not performed, and sends the second action request 7b to one of the one or more external resource-managing functions managing a device on which all or the part of the requested processing is to be performed (i.e., a resource-managing function in the management-server computer 4 in the example of FIG. 1).

When no action handler is detected by the action-handler search unit 1b, the action-request transfer unit 1c sends a third action request 7c indicating the same information as the first action request 7a to one of the one or more external resource-managing functions managing a device on which the requested processing indicated in the first action request 7a is to be performed (i.e., a resource-managing function in the management-server computer 3 in the example of FIG. 1).

In the case where the management-server computer 1 has the functions explained above, when the first action request 7a is inputted into the management-server computer 1, the action-handler search unit 1b analyzes the request condition indicated in the received first action request 7a, and then searches the action-handler table 1aa for an action handler corresponding to the request condition indicated in the received first action request 7a.

Then, the action execution unit 1d starts the action handler detected by the action-handler search unit 1b, so that the processing defined in the action handler is performed. In the case where all or part of the processing which is requested by the first action request 7a is not performed by the action execution unit 1d, the action execution unit 1d produces a second action request 7b indicating in the common data form a request condition of all or the part of the requested processing which is not performed by the action execution unit 1d, and sends the second action request 7b to one of the one or more external resource-managing functions managing the device on which all or the part of the requested processing is to be performed by the action execution unit 1d.

When no action handler is detected by the action-handler search unit 1b, the action-request transfer unit 1c sends a third action request 7c indicating the same information as the first action request 7a to one of the one or more external resource-managing functions managing a device on which the requested processing indicated in the first action request 7a is to be performed.

Each of the first action request 7a, the second action request 7b, and the third action request 7c contains, for example, the name of the resource-managing function which produces the action request, one or more names of one or more resource-managing functions which relay the action request, information on one or more resources on which processing is to be performed, one or more portions of the one or more resources on which the processing is to be performed, and information on an action requested to be performed.

When action requests in which information on requested processing is indicated in the common data form are transferred between the resource-managing functions in the management-server computers 1 to 4, each of the management-server computers 1 to 4 can analyze the information on the requested processing which is indicated in each action request received by the management-server computer. In addition, details of processing to be performed in response to each action request can be uniquely defined in an action handler. Therefore, it is possible to transfer action requests between the resource-managing functions while maintaining sophisticated management capabilities unique to the respective resource-managing functions.

In other words, since the data format used in action requests transferred between the resource-managing functions are common, the resource-managing function in each management-server computer can produce an action request independently of the processing functions of the destination management-server computer. Further, it is possible to associate the requested processing indicated in each action request with an action handler by using the action-handler table 1aa, where the action handler is arranged for performing sophisticated resource management in each resource-managing function.

Consequently, resource managers which are arranged for message exchange in accordance with respective unique protocols can cooperate to perform processing. For example, in the case where two server computers in which different operating systems (OSs) are installed perform identical resource-managing processing, different components operate in the two server computers. Even in such a case, another resource-managing function can make the two server computers perform the identical resource-managing processing by simply sending to the two server computers action requests indicating identical information. Therefore, the interoperability is increased.

In addition, in the case where all or part of the requested processing is not completed even after the processing according to the action handler is performed, another action request for all or the part of the requested processing is outputted. Therefore, even in the case where the resource-managing functions are hierarchized, higher-level resource-managing functions can automatically request lower-level resource-managing functions to perform processing.

That is, the resource-managing function 2 which first outputs the first action request 7a is not required to recognize whether or not the resource-managing functions in the following stages are hierarchized, so that the operation of requesting processing by use of action requests is facilitated even in the case where resource management is performed in a hierarchized configuration.

Next, the embodiment of the present invention is explained in detail below. In the following explanations, the resource-managing functions arranged in management-server computers which manage resources are referred to as resource managers, the resource-managing functions which manage resources in accordance with instructions from the resource managers are referred to as agents, and the resource-managing functions including both the resource managers and the agents are collectively referred to as components.

In addition, in the following explanations, the server functions realized in computers by executing server applications are referred to servers, and the computers executing the server applications are referred to as server computers.

In the embodiment explained below, each component comprises a database storing a log of transmitted and received action requests, executed actions, and the like, in addition to the functions illustrated in FIG. 1. Since each component holds the log of the transmitted and received action requests and the executed actions, it is possible to trace components and resources influenced by each action request, and facilitate cancellation of an action, visualization of the extent of influence of each action request, and the like.

Figure 2:
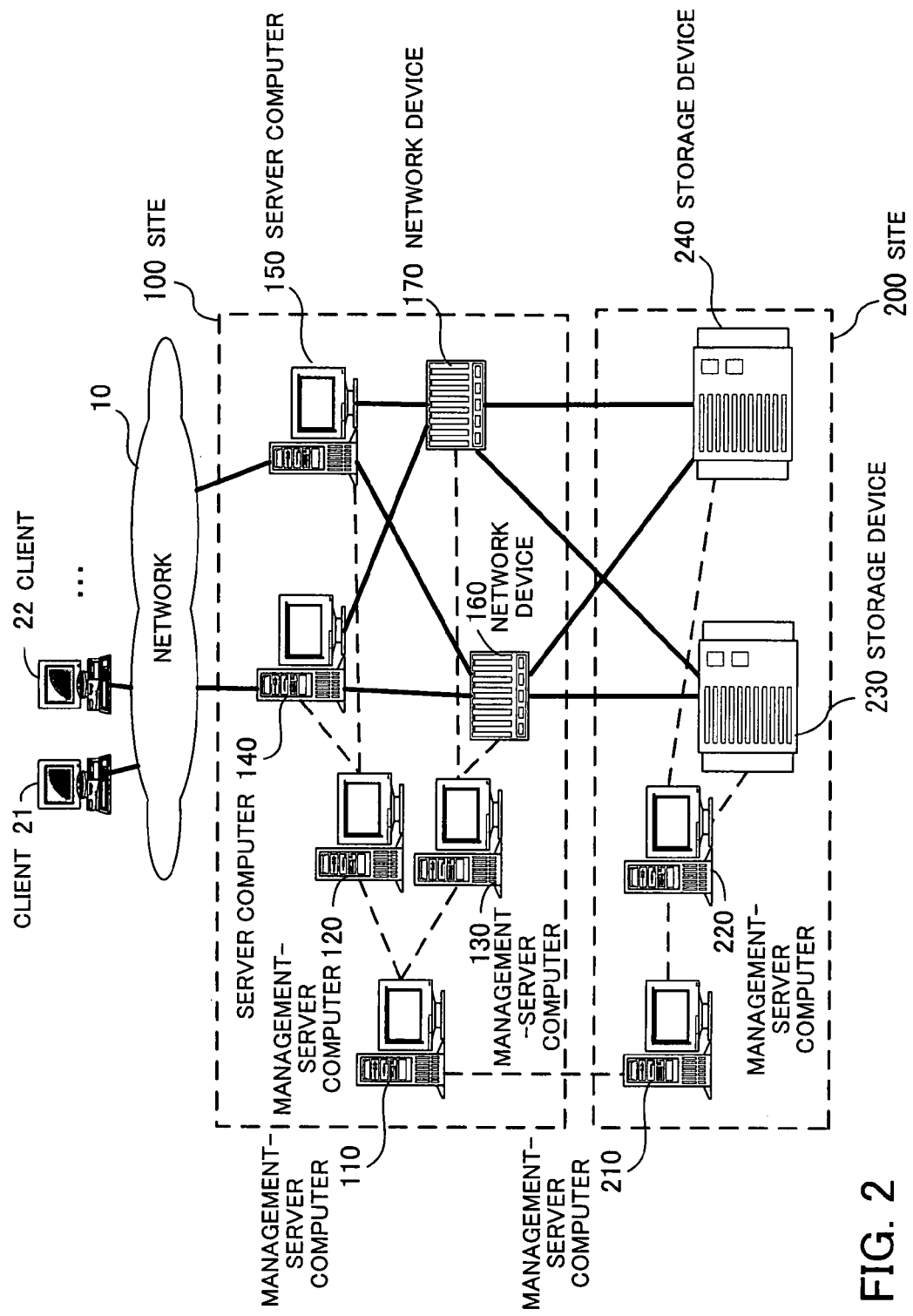
FIG. 2 is a diagram illustrating a system construction of the embodiment of the present invention.

FIG. 2 is a diagram illustrating the system construction of the embodiment of the present invention. In the embodiment of the present invention, the system provides services to the clients 21, 22, . . . through the network 10, and the resources are managed in a plurality of sites 100 and 200. In FIG. 2, the connections for system management are indicated by dashed lines.

The management-server computers 110, 120, and 130, server computers 140 and 150, and network devices 160 and 170 belong to the site 100. The management-server computer 110 is connected to the management-server computers 120 and 130, and manages all the resources in the site 100 in a centralized manner. The management-server computers 120 is connected to the server computers 140 and 150, and manages the resources provided by the server computers 140 and 150. The management-server computers 130 is connected to the network devices 160 and 170, and manages the resources provided by the network devices 160 and 170.

The server computers 140 and 150 are connected to the clients 21, 22, . . . through the network 10, and provides, for example, functions of web server applications and the like to the clients 21, 22 . . . . The network devices 160 and 170 are connected between the server computers 140 and 150 belonging to the site 100 and the storage devices 230 and 240 belonging to the site 200, and has functions of transferring packets between the server computers 140 and 150 and the storage devices 230 and 240.

The management-server computers 210 and 220 and the storage devices 230 and 240 belong to the site 200. The management-server computer 210 is connected to the management-server computer 220, and manages all the resources in the site 200 in a centralized manner. The management-server computers 220 is connected to the storage devices 230 and 240, and manages the resources provided by the storage devices 230 and 240. The storage devices 230 and 240 store and manage information, and provides the functions of inputting information from and outputting information to the server computers 140 and 150.

Figure 3:
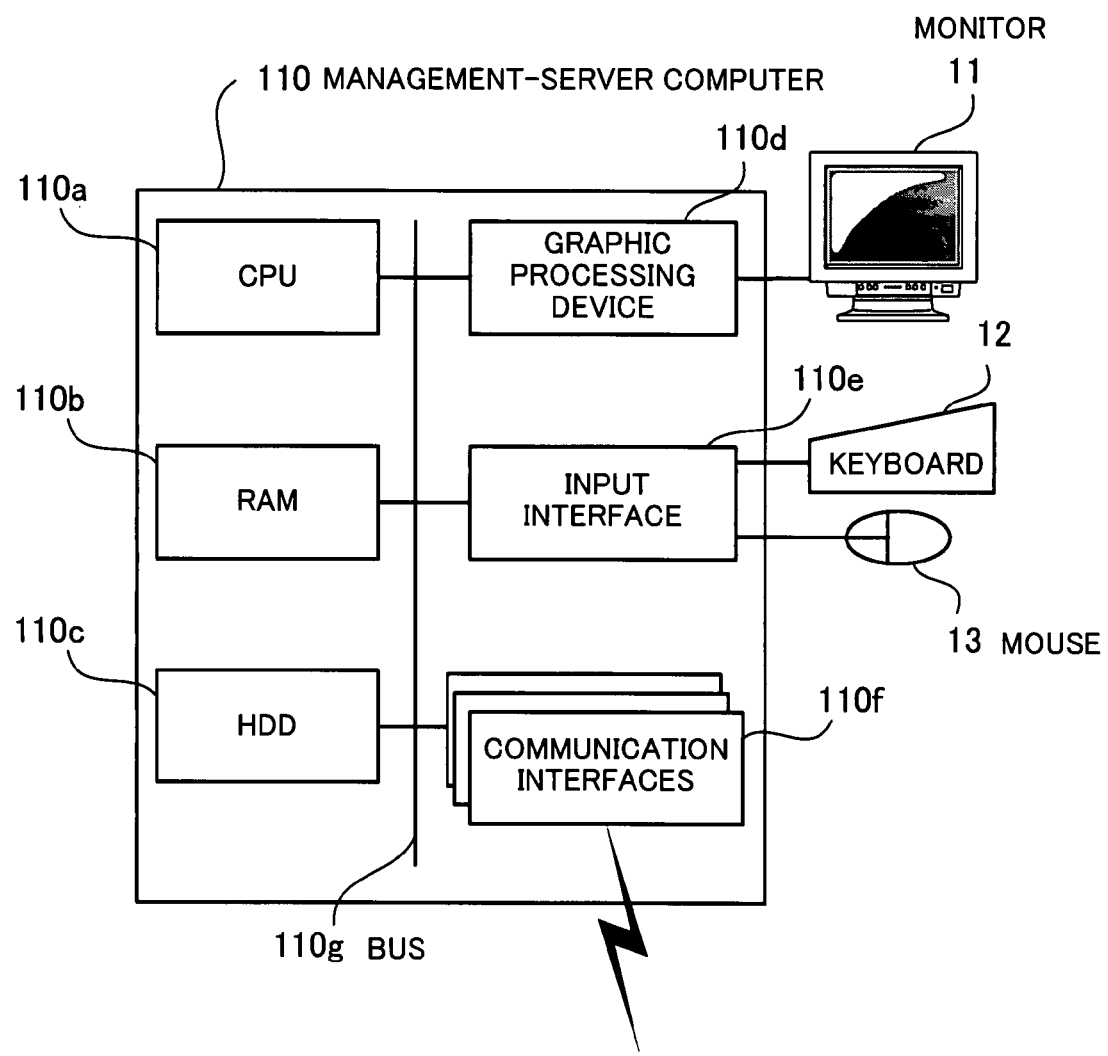
FIG. 3 is a diagram illustrating an example of a hardware construction of a management-server computer used in the embodiment.

FIG. 3 is a diagram illustrating an example of the hardware construction of each management-server computer used in the embodiment. The management-server computer 110 is controlled by a CPU (central processing unit) 110a, to which a RAM (random access memory) 110b, an HDD (hard disk drive) 10c, a graphic processing device 10d, an input interface 110e, and one or more communication interfaces 110f are connected through a bus 110g.

The RAM 110b temporarily stores at least portions of an OS (operating system) program and application programs which are executed by the CPU 110a, as well as various types of data necessary for processing by the CPU 110a. The HDD 110c stores the OS program and the application programs.

A monitor 11 is connected to the graphic processing device 10d, which makes the monitor 11 display an image on a screen in accordance with an instruction from the CPU 110a. A keyboard 12 and a mouse 13 are connected to the input interface 110e, which transmits signals sent from the keyboard 12 and the mouse 13, to the CPU 110a through the bus 110g.

The communication interfaces 110f are connected to one or more networks, and exchanges data with other computers through the one or more networks.

By using the above hardware construction, it is possible to realize the processing functions of the present embodiment. Although FIG. 3 shows the hardware construction of only the management-server computer 110, each of the other management-server computers 120 and 130, the server computers 140 and 150, the management-server computers 210 and 220, and the storage devices 230 and 240 can also be realized with a similar hardware construction.

Figure 4:
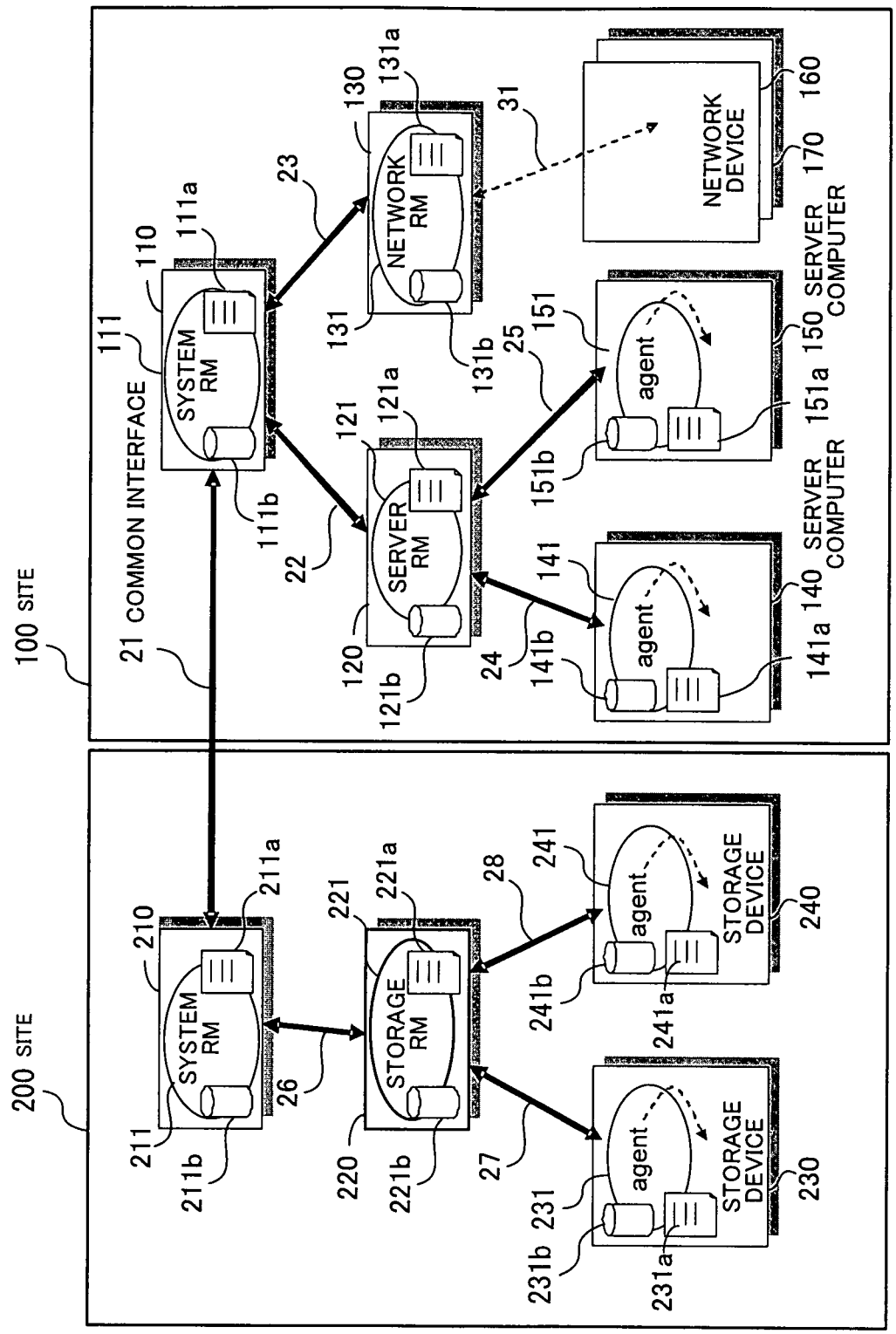
FIG. 4 is a diagram illustrating constructions of the resource-managing functions.

FIG. 4 is a diagram illustrating the constructions of the resource-managing functions. First, the functions and data of each of the devices belonging to the sites 100 and 200 are explained.

The management-server computer 110 comprises a system RM (resource manager) 111, which contains an action-handler table 111a and a log DB (database) 111b.

The management-server computer 120 comprises a server RM (resource manager) 121, which contains an action-handler table 121a and a log DB 121b. The management-server computer 130 comprises a network RM (resource manager) 131, which contains an action-handler table 131a and a log DB 131b.

The server computer 140 comprises an agent 141, which contains an action-handler table 141a and a log DB (database) 141b. The server computer 150 comprises an agent 151, which contains an action-handler table 151a and a log DB 151b.

The system RM 111 is a higher-level resource manager which manages the entire or part of the site 100 in an integrated manner, and can manage all the resources in the site 100 in liaison with the server RM 121 and the network RM 131.

The server RM 121 manages the resources provided by the server computers 140 and 150 in liaison with the agents 141 and 151. The network RM 131 manages the resources provided by the network devices 160 and 170. The agents 141 and 151 manage the resources in the server computers 140 and 150 in accordance with instructions from the server RM 121.

The management-server computer 210 comprises a system RM (resource manager) 211, which contains an action-handler table 211a and a log DB (database) 211b. The management-server computer 220 comprises a storage RM (resource manager) 221, which contains an action-handler table 221a and a log DB 221b.

The storage device 230 comprises an agent 231, which contains an action-handler table 231a and a log DB (database) 231b. The storage device 240 comprises an agent 241, which contains an action-handler table 241a and a log DB 241b.

The system RM 211 is a higher-level resource manager which manages the entire or part of the site 200 in an integrated manner, and can manage all the resources in the site 200 in liaison with the storage RM 221.

The storage RM 221 manages the resources provided by the storage devices 230 and 240 in liaison with the agents 231 and 241. The agents 231 and 221 respectively manage the resources in the storage devices 230 and 240 in accordance with instructions from the storage RM 241.

The action-handler tables 111a, 121a, 131a, 141a, 151a, 211a, 221a, 231a, and 241a arranged in the devices show action handlers that perform processing according to action information sent to the corresponding devices, respectively. A history of the action information sent to each device and action information produced in the device is stored in the corresponding one of the log DBs 111b, 121b, 131b, 141b, 151b, 211b, 221b, 231b, and 241b in the device.

The communication interfaces between the functions are explained below. The system RM 111 and the server RM 211 are connected through a common (commonized) interface 21, the system RM 111 and the server RM 121 are connected through a common interface 22, the system RM 111 and the server RM 121 are connected through a common interface 23, the server RM 121 and the agent 141 are connected through a common interface 24, the server RM 131 and the agent 151 are connected through a common interface 25, the system RM 211 and the storage RM 221 are connected through a common interface 26, the storage RM 221 and the agent 231 are connected through a common interface 27, and the storage RM 221 and the agent 241 are connected through a common interface 28.

The network RM 131 and the network devices 160 and 170 are connected through a noncommon (uncommonized) interface 31, which is, for example, a standardized interface such as SNMP (Simple Network Management Protocol) or CLI (Command-line Interface).

The resource managers illustrated in FIG. 4 can also provide various other managing functions in addition to the function of directly managing the target resources. For example, the resource managers illustrated in FIG. 4 can regard a plurality of resources as a virtual resource, or group resources having an identical architecture.

The site 100 illustrated in FIG. 4 contains a two-layer structure in which the server RM 121 and the network RM 131 are arranged under the system RM 111. Similarly, the site 200 illustrated in FIG. 4 also contains a two-layer structure in which the storage RM 221 is arranged under the system RM 210. The hierarchic structures illustrated in FIG. 4 are examples of the hierarchic structure, and the hierarchic structure of resource managers may have a greater number of layers.

The resources in which no agent is arranged as the network devices 160 and 170 can execute only the actions which can be externally designated.

Although the two sites, two server devices, two storage devices, and two network devices are illustrated in the configuration of the present embodiment for convenience of explanation, generally, a system according to the present invention can contain an arbitrary number of sites, an arbitrary number of server devices, an arbitrary number of storage devices, and an arbitrary number of network devices.

In the system having the above construction, the communication between the resource managers and between each resource manager and an agent are performed by using the common interfaces 21 to 28. However, the communication between a resource having no agent and a manager managing the resource is performed by using a unique interface or the noncommon interface 31 such as SNMP.

For example, when action information indicating an action to be executed by the server computer 140 is issued from the system RM 211, the action information is transferred from the system RM 211 to the system RM 111 through the common interface 21.

Then, the system RM 111 determines the action corresponding to the received action information by reference to the action-handler table 111a, executes an action which is to be executed by the system RM 111, recognizes that the received action information is issued for the server computer 140 connected to the server RM 121, and sends action information to the server RM 121 through the common interface 22. At this time, the system RM 111 stores in the log DB 111b the received action information, details of the action executed by the system RM 111, and the action information sent to the server RM 121.

Next, the server RM 121 determines the action corresponding to the received action information by reference to the action-handler table 121a, executes an action which is to be executed by the server RM 121, recognizes that the received action information is issued for the server computer 140, and sends action information to the agent 141 through the common interface 24. At this time, the server RM 121 stores in the log RM 121b the received action information, details of the action executed by the server RM 121, and the action information sent to the server computer 140.

Finally, the agent 141 determines and executes the action corresponding to the received action information by reference to the action-handler table 141a. At this time, the agent 141 stores in the log RM 141b the received action information and details of the action executed by the agent 141.

As explained above, the action information issued from the system RM 211 is transferred through the system RM 111 and the server RM 121 to the agent 141, so that a command or the like corresponding to the designated action information is executed by the agent 141.

Next, the functions of the respective components (resource managers and agents) illustrated in FIG. 4 are explained in detail below.

Figure 5:
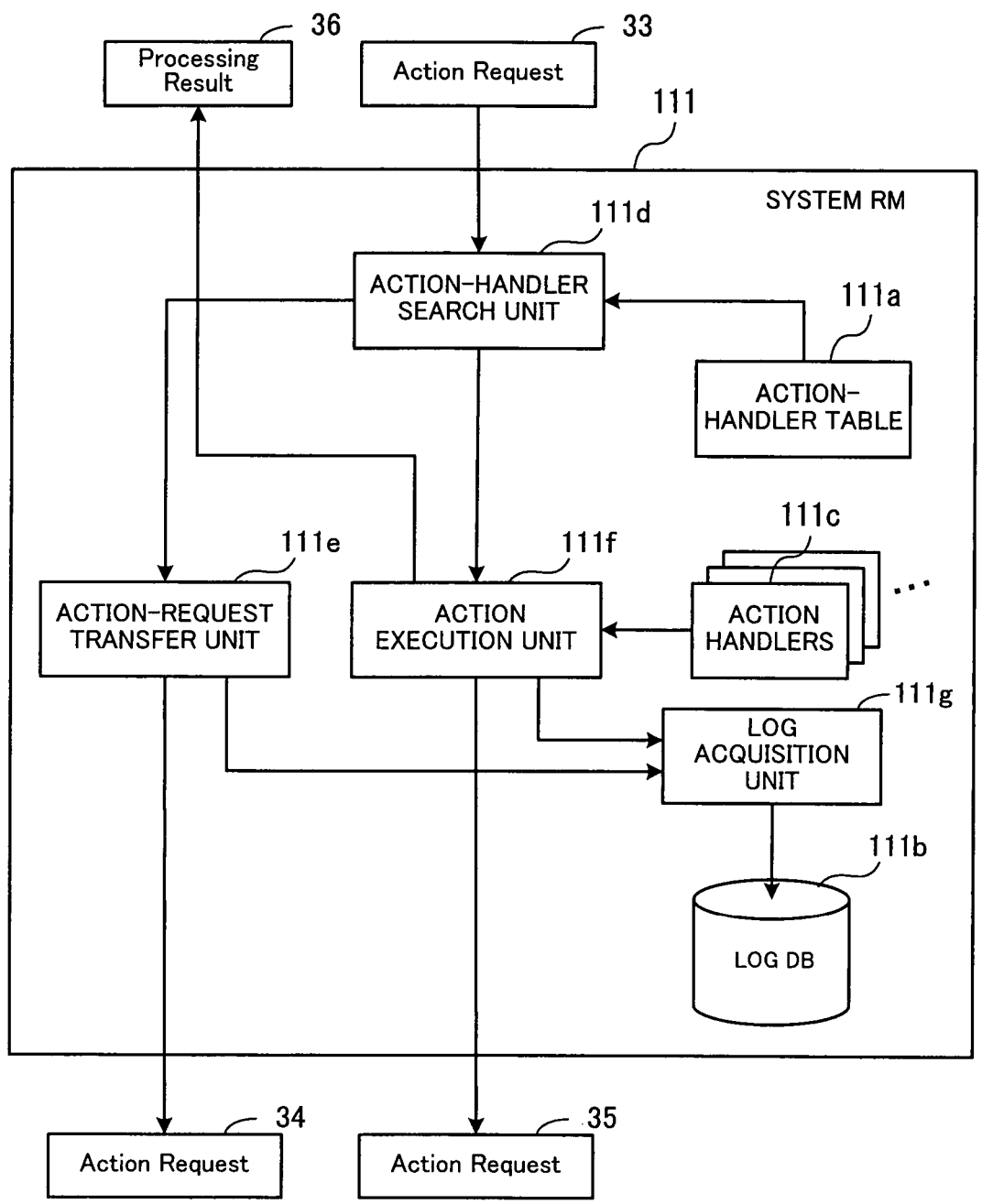
FIG. 5 is a diagram illustrating an internal structure of a system RM.

FIG. 5 is a diagram illustrating an internal structure of one of the system RMs. The system RM 111 comprises the action-handler table 111a, the log DB 111b, a plurality of action handlers 111c, an action-handler search unit 111d, an action-request transfer unit 111e, an action execution unit 111f, and a log acquisition unit 111g. The information in the action-handler table 111a and the log DB 111b are as explained before with reference to FIG. 4.

The action handlers 111c are programs (commands, scripts, or the like) which describe details of resource-managing operations to be performed according to the action information.

When the action-handler search unit 111d receives an action request 33 from another component, the action-handler search unit 111d searches the action-handler table 111a for an action handler corresponding to the action indicated in the action request 33. Then, the action-handler search unit 111d informs the action execution unit 111f of the name of the detected action handler. When the action-handler search unit 111d cannot detect the action handler, the action-handler search unit 111d informs the action-request transfer unit 111e that no action handler corresponds to the action.

The action-request transfer unit 111e recognizes, on the information from the action-handler search unit 111d, that no action handler corresponds to the action request 33, and determines another component by which the action indicated by the action request 33 is to be executed. For example, in the case where a resource which is indicated by the action request 33 to be managed is a server, the action-request transfer unit 111e determines that the server RM 121 is the component by which the action indicated by the action request 33 is to be executed. Then, the action-request transfer unit 111e sends to the above component an action request 34 which requests the same action as the action request 33.

When the action execution unit 111f receives the name of the action handler from the action-handler search unit 111d, the action execution unit 111f acquires the corresponding action handler from the action handlers 111c, starts the acquired action handler, and executes the processing defined in the action handler.

When processing which another component is to be requested to perform occurs in the started action handler, the action execution unit 111f produces a new action, and sends to the other component an action request 35 which requests execution of the new action. When the processing is completed, the action execution unit 111f returns a processing result 36 to the component which produces the action indicated in the action request 33.

It is possible to make a plurality of operations in the common data form for defining an action request, and designate the order of execution of the operations in the common data form. In the case where the order of execution of a plurality of operations is designated in a received action request, the action execution unit 111f starts action handlers respectively corresponding to the plurality of operations in the designated order.

The log acquisition unit 111g acquires from the action-request transfer unit 111e and the action execution unit 111f details of the executed actions as log information, and stores the acquired log information in the log DB 111b.

Since the system RM 111 has the above functions, it is possible to transfer an action request to another component through a common interface, receives an action from another component through a common interface, and execute the action designated in the received action request. Although the functions of only the system RM 111 are illustrated in FIG. 5, each of the other resource managers has similar functions.

Figure 6:
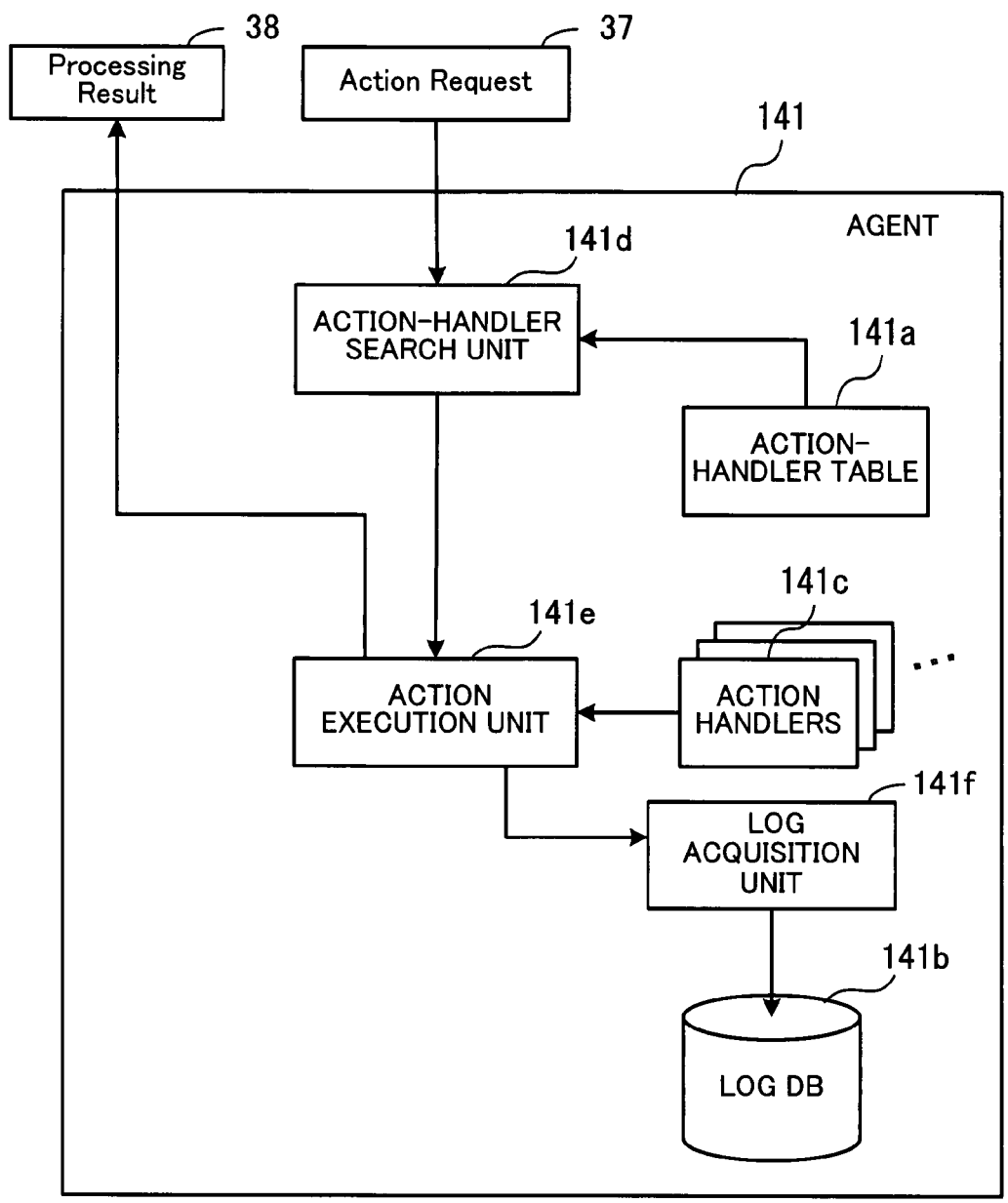
FIG. 6 is a diagram illustrating an internal structure of an agent.

FIG. 6 is a diagram illustrating an internal structure of one of the agent. The agent 141 comprises the action-handler table 141a, the log DB 141b, a plurality of action handlers 141c, an action-handler search unit 141d, an action execution unit 141e, and a log acquisition unit 141f. The information in the action-handler table 141a, the log DB 141b, and the action handlers 141c are respectively similar to the information in the action-handler table 111a, the log DB 111b, and the action handlers 111c.

Similar to the action-handler search unit 111d in the system RM 111 as shown in FIG. 5, the action-handler search unit 141d searches the action-handler table 141a for an action handler corresponding to an action indicated in an action request 37. When no action handler corresponding to the action indicated in the action request 37 is detected by the above search, the action-handler search unit 141d sends an error message to the sender of the action request 37.

Similar to the action execution unit 111f in the system RM 111 as shown in FIG. 5, the action execution unit 141e performs processing in accordance with an action handler detected by the action-handler search unit 141d, and outputs a processing result 38. However, the action execution unit 141e does not produce an action request to another component. The log acquisition unit 141f stores in the log DB 141b a log of details of the processing performed by the action execution unit 141e and the like.

As explained above, it is unnecessary for the agent 141 to request another component to perform processing. Therefore, the agent 141 does not need the function corresponding to the action-request transfer unit 111e. Although the functions of only the agent 141 in the server computer 140 are illustrated in FIG. 6, each of the other agents has similar functions.

Next, the data structure of the action information is explained in detail. The action information exchanged between components through a common interface includes information on a component which produces the instruction, one or more components which relay the instruction, a resource to be managed, a part of the resource on which the action is executed, and the type of the action.

Figure 7:
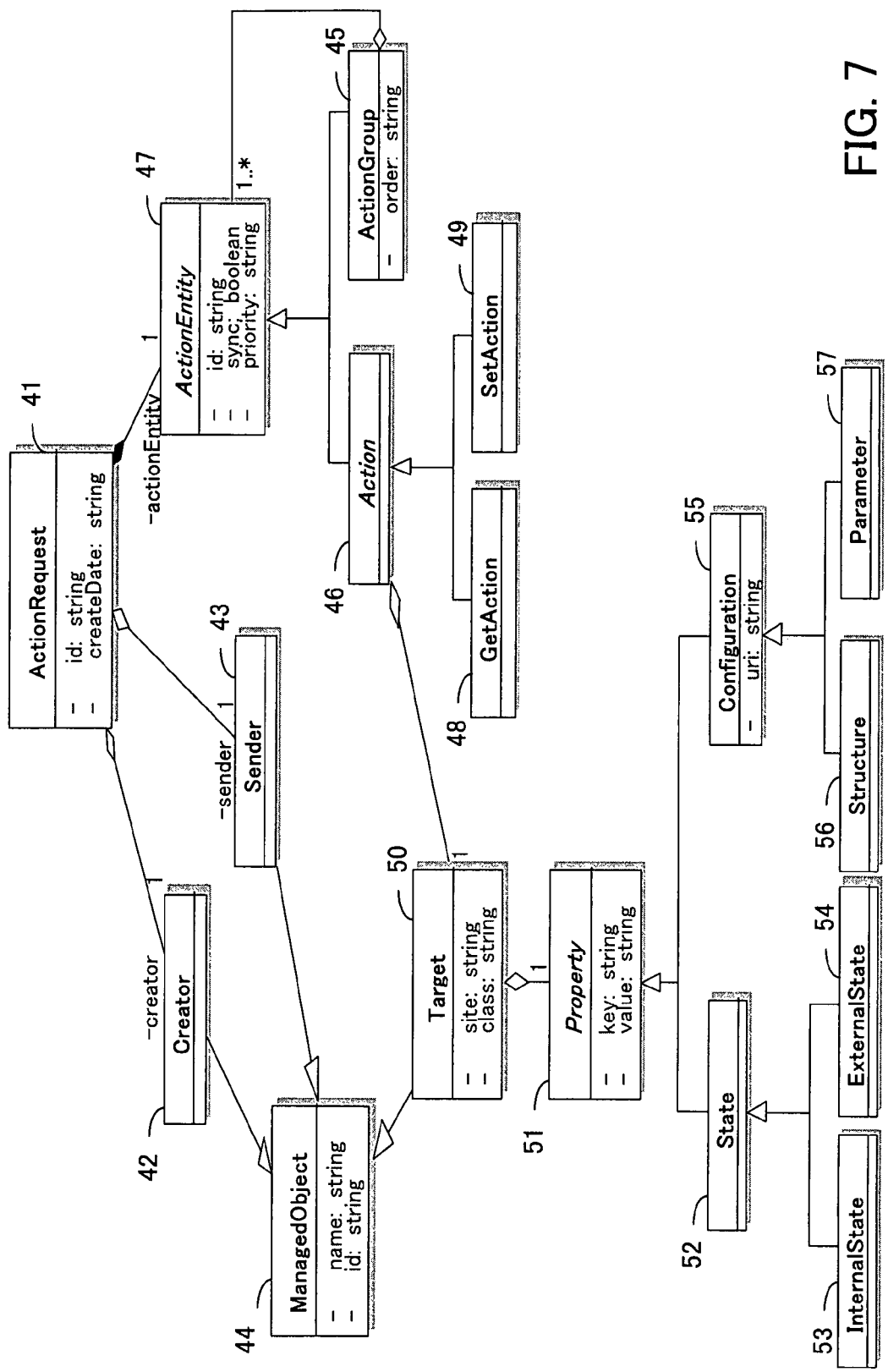
FIG. 7 is a UML (United Modeling Language) model diagram illustrating a data model of action information.

FIG. 7 is a UML (Unified Modeling Language) model diagram illustrating a data model of action information. Hereinbelow, data contained in respective elements are explained.

The ActionRequest element 41 is the top-level element, and a unit of the action request transferred between the components. The ActionRequest element 41 has the attribute "ID" and the attribute "createDate" indicating the production date, and has the Creator element 42, the Sender element 43, and the ActionEntity element 47 as the contents.

The Creator element 42 contains information on components which produce actions (i.e., identification information for resource managers).

The Sender element 43 contains information on components from which action requests are transferred.

The ManagerObject element 44 corresponds to a component or resource which is to be managed. Further, the Creator element 42 element, the Sender element 43, and the Target element 50 are derived from the ManagerObject element 44 according to the responsibility. The ManagerObject element 44 has the attribute "ID" and the attribute "name," which is a name attribute.

The ActionGroup element 45 is a class representing a group of actions. The ActionGroup element 45 includes at least one ActionEntity element 47, and has the attribute "order," which designates the order of execution of more than one ActionEntity element 47 included in the ActionGroup element 45.

The Action element 46 is an abstract class representing details of each action. (The abstract class is a class providing an abstract definition, does not allow production of an instance, and is arranged based on the premise that inheritance is performed.)

The ActionEntity element 47 is an abstract class representing details of the action, and the Action element 46 and the ActionGroup element 45 are derived from the ActionEntity element 47. The ActionRequest element 41 includes only one ActionEntity element 47. This means that the ActionRequest element 41 includes either the Action element 46 or the ActionGroup element 45. That is, each action request can designate either a single action or an action group, and the action group may consist of a plurality of actions or have a hierarchic structure containing a plurality of action groups. In addition, the ActionEntity element 47 may have the attribute "ID," the attribute "sync," and the attribute "priority." The attribute "sync" designates whether to wait until a result is returned, and the attribute "priority" indicates the priority of the action.

Each of the GetAction element 48 and the SetAction element 49 is a concrete (nonabstract) class of the Action class. The GetAction element 48 is used for designating actions related to acquisition (get), and the SetAction element 49 is used for designating actions related to information setting (set). Further, when one or more actions which can be executed on one or more objects, as well as the get and set actions, are registered in advance in an action-handler table, it is possible to designate an appropriate one of the registered actions in an action request in a similar manner to the GetAction element 48 or the SetAction element 49.

The Target element 50 designates a target object on which an action is to be executed. Generally, the target object is a resource such as a server, storage, network, or software. In addition, the target object may be a service, a server domain which is defined by logically grouping a plurality of servers, or the like.

The Target element 50 has the attribute "class," which indicates the target type. In addition, the Target element 50 also has the attributes "name" and "id," by which an instance of the class is specified. Further, the Target element 50 has the attribute "site," which designates a site in which the target object resides.

The Property element 51 is an element for designating a part of the object on which the action is executed, and also indicates the state and configuration of the object designated by the Target element 50. The Property element 51 has the attribute "key," which designates a key to the part of the object on which the action is executed. In addition, the Property element 51 has the attribute "value," in which a setting value for a designated part is designated in the cases of actions related to information setting. Further, the State element 52 indicating the state and the Configuration element 55 indicating the configuration are derived from the Property element 51.

The State element 52 indicates the state of the target object. The utilization ratio of a server, the start/stop status of software, and the like are handled as the State element 52, and an action such as acquisition or setting is executed on the object in the state indicated by the State element 52. Further, the InternalState element 53 and the ExternalState element 54 are derived from the State element 52.

The InternalState element 53 indicates the internal state of the target object. For example, the CPU utilization ratio of a server, the start/stop status of software, and the like correspond to the InternalState element 53.

The ExternalState element 54 indicates an external state of the target object, which is an externally observed state of the target object (i.e., the state of the target object observed from an object other than the target object). For example, the active/inactive state of a server corresponds to the external state of the target object. Therefore, in the case where the class of the ExternalState element 54 is designated for an action, a component which monitors the target object is responsible for monitoring the external state of the target object indicated by the ExternalState element 54.

The Configuration element 55 indicates configuration and settings of the target object. For example, increase or decrease in the amount of resources included in the target object, setting parameters, and the like are handled as the Configuration element 55, and an action such as acquisition or setting is executed on the configuration and settings indicated by the Configuration element 55. Further, the Structure element 56 and the Parameter element 57 are derived from the class of the Configuration element 55.

The Configuration element 55 has the attribute "uri" for referring to an external entity such as a file or a web page. It is assumed that information on configuration and the like desired to be acquired or set is stored in the external entity. The format of the information stored in the external entity is arbitrary as long as the component which executes the action can interpret the information.

The Structure element 56 indicates the structure of the target object. For example, a group of servers registered in a service domain, a combination of applications realizing a service, and the like correspond to the Structure element 56.

The Parameter element 57 indicates the settings of the target object. For example, the memory amount used by software, VLAN (Virtual Local Area Network) settings in a switch, and the like correspond to the Parameter element 57.

Further, as illustrated in FIG. 7, the action information also contains other data such as information on the date and time of production of the action. Although the data format of the transmitted action information is arbitrary as long as the above information is contained in the action information, the XML (eXtensible Markup Language) form is preferable from the viewpoint of portability and extensibility.

Figure 8:
FIG. 8 is a diagram illustrating an example of a data structure of an action-handler table.

FIG. 8 is a diagram illustrating an example of a data structure of the action-handler table. A record consisting of the fields of the target type, the property, the action, and details of execution is registered in the action-handler table 102.

The type of the target on which the action is to be executed is set in the field of the target type. For example, the type of "Service" (which is provided to users), "Server" (as a processing function for providing the service), "Network Device," "Software," or the like is set in the filed of the target type.

The property of the target on which the action is to be executed is set in the field of the property. For example, the property of "Configuration" (for operations of related to the system configuration), "Parameters" (for operations of setting the parameters, and the like), "State" (for operations of monitoring operational status), or the like is set in the filed of the property.

The type of actions which can be executed on the property of the target object is set in the field of the action. For example, the type of "set" or "get" is set.

In addition, information for identifying an action handler such as a command or script which are actually executed (e.g., a file name) is set in the filed of the details of execution.

Next, processing which is performed when each component receives an action request is explained below.

Figure 9:
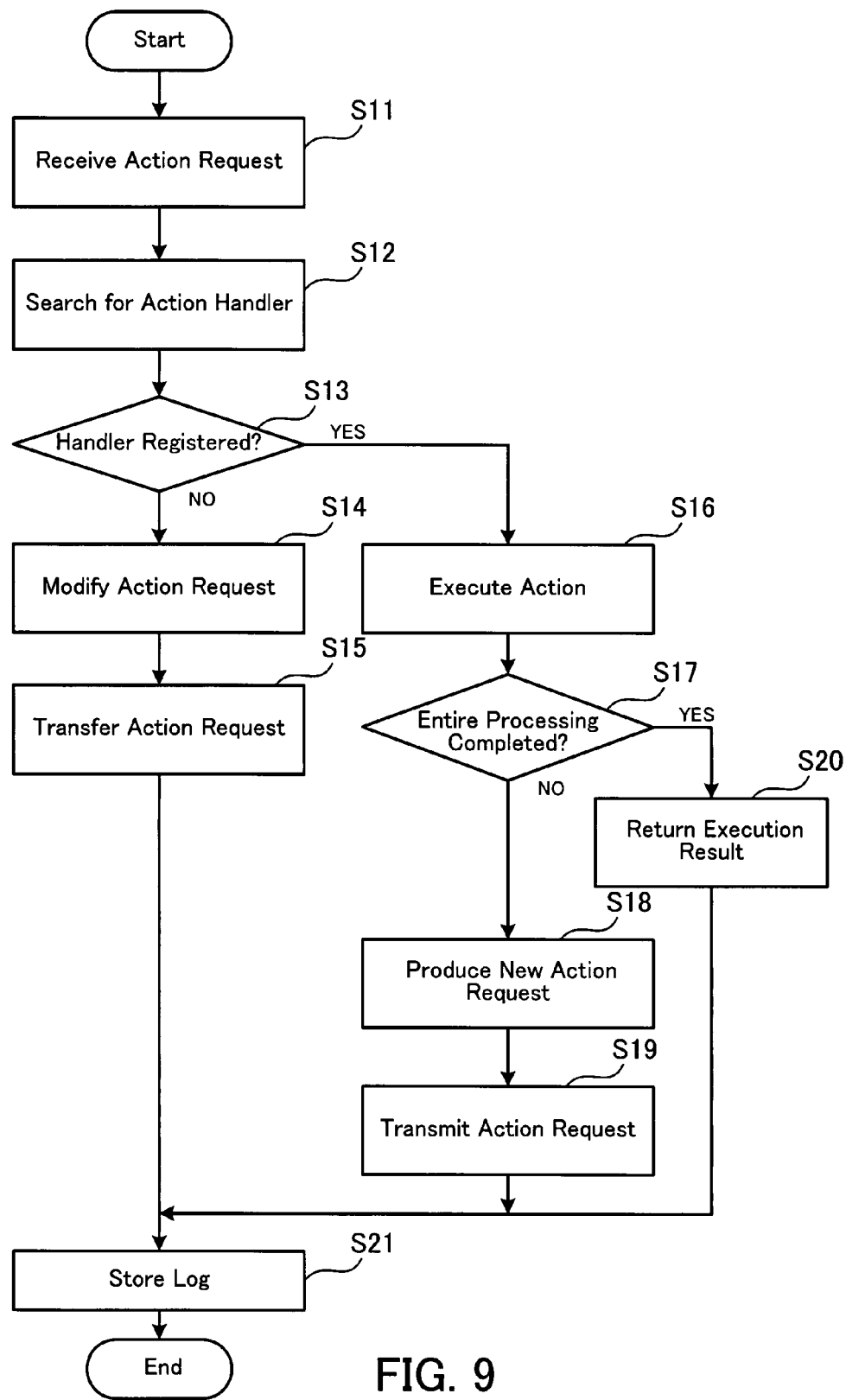
FIG. 9 is a flow diagram indicating a sequence of processing performed by a resource manager in response to an action request.

FIG. 9 is a flow diagram indicating a sequence of processing performed by a resource manager in response to an action request. The sequence of processing indicated in FIG. 9 is explained below step by step. Although the processing performed by the system RM 111 when an action request is sent to the system RM 111 is taken as an example in the following explanations, the other resource managers perform similar processing.

\<Step S11\>

The action-handler search unit 111d in the system RM 111 receives an action request 33.

\<Step S12\>

The action-handler search unit 111d interprets the action in the received action request 33, and searches the action-handler table 111a for an action handler corresponding to the action. Specifically, the action-handler search unit 111d searches the action-handler table 111a for an appropriate record by using as keys the type of the target object, the property, and the type of the action which are written in the action request. When a record matching the keys is detected by the search, the action-handler search unit 111d acquires the details of execution (e.g., the name of an action handler).

\<Step S13\>

When the action handler to the action in the action request 33 is registered in the action-handler table 111a, the action-handler search unit 111d informs the action execution unit 111f of the name of the action handler, and then the operation goes to step S16. When no action handler corresponding to the action in the action request 33 is registered in the action-handler table 111a, the action-handler search unit 111d informs the action-request transfer unit 111e of the absence of the action handler matching the keys, and then the operation goes to step S14.

<Step S14>
When no action handler corresponding to the action in the action request 33 is registered in the action-handler table 111a, the action-request transfer unit 111e modifies the sender information indicating the sender of the action request 33. Specifically, the system RM 111 changes the information on the sender of the action request 33 with the identification information indicating the system RM 111.

<Step S15>
The action-request transfer unit 111e transfers the action request 33 modified in step S14 (as an action request 34) to a component which is suitable for processing the action request 33. Thereafter, the operation goes to step S21.

<Step S16>
When a record matching the type of the target object, the property, and the type of the action which are written in the action request is detected by the search of the action-handler table 111a using the type of the target object, the property, and the type of the action as keys, the action execution unit 111f executes the action handler (a command, a script, or the like) which is indicated as the details of execution in the record. At this time, the action execution unit 111f converts the details of execution into a form suitable for input of designated command or script, and passes the converted information on the action to a process which executes the command or script.

<Step S17>
The action execution unit 111f determines whether or not the entire processing requested by the action request 33 is completed. When yes is determined, the operation goes to step S20. When it is determined that all or part of the requested processing is not completed, the operation goes to step S18.

<Step S18>
In the case where all or part of the processing requested by the action request 33 is not performed, the action execution unit 111f produces a new action request 35 for execution of all or the part of the processing requested by the action request 33 which is not performed.

<Step S19>
The action execution unit 111f sends the action request 35 produced in step S18 to a component suitable for execution of all or the part of the processing requested by the action request 33 which is not performed. Thereafter, the operation goes to step S21.

<Step S20>
When the entire processing requested by the action request 33 is completed, the action execution unit 111f returns the result of the processing to the sender of the action request 33.

<Step S21>
The system RM 111 stores the details of the processing in the log DB 111b, and thereafter the processing of FIG. 9 is completed.

Next, processing performed by an agent in response to an action request is explained below.

Figure 10:
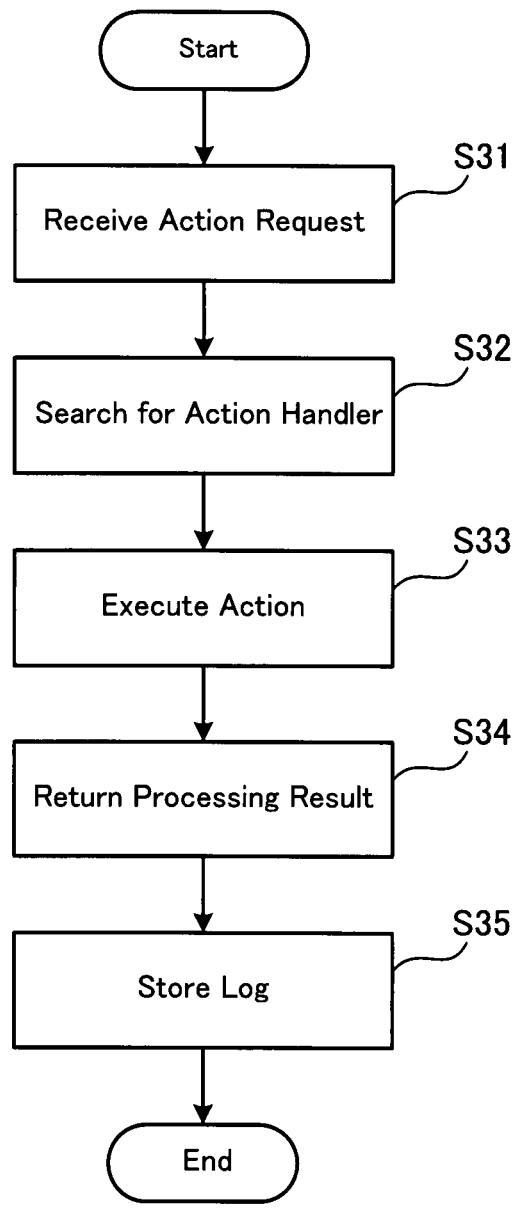
FIG. 10 is a flow diagram indicating a sequence of processing performed by an agent in response to an action request.

FIG. 10 is a flow diagram indicating a sequence of processing performed by an agent in response to an action request. The sequence of processing indicated in FIG. 10 is explained below step by step. Although processing performed by the agent 141 when an action request is sent to the agent 141 is taken as an example in the following explanations, the other agents perform similar processing.

<Step S31>
The action-handler search unit 141d receives an action request 37.

<Step S32>
The action-handler search unit 141d interprets the action in the received action request 37, and searches the action-handler table 141a for an action handler corresponding to the action. Specifically, the action-handler search unit 141d searches the action-handler table 141a for an appropriate record by using as keys the type of the target object, the property, and the type of the action which are written in the action request 37. When a record matching the keys is detected by the search, the action-handler search unit 141d acquires the details of execution (e.g., the name of an action handler).

<Step S33>
When a record matching the type of the target object, the property, and the type of the action which are written in the action request is detected by the search of the action-handler table 141a using the type of the target object, the property, and the type of the action as keys, the action execution unit 141e executes the action handler (a command, a script, or the like) which is indicated as the details of the action in the record. At this time, the action execution unit 141e converts the information on the action into a form suitable for input of designated command or script, and passes the converted information on the action to a process which executes the designated command or script.

<Step S34>
The action execution unit 141e returns the result of the processing to the sender of the action request.

<Step S35>
The action execution unit 141e stores the details of the processing in the log DB 141b, and thereafter the processing of FIG. 10 is completed.

As explained above, the agent 141 is not required to send an action request to another component. Therefore, the agent 141 does not perform processing for modification, production, and the like of an action request.

As clarified by the sequences indicated in FIGS. 9 and 10, in the system according to the present embodiment, an action request is not necessarily directly transferred from the generator of the action request to a component which executes the action.

Figure 11:
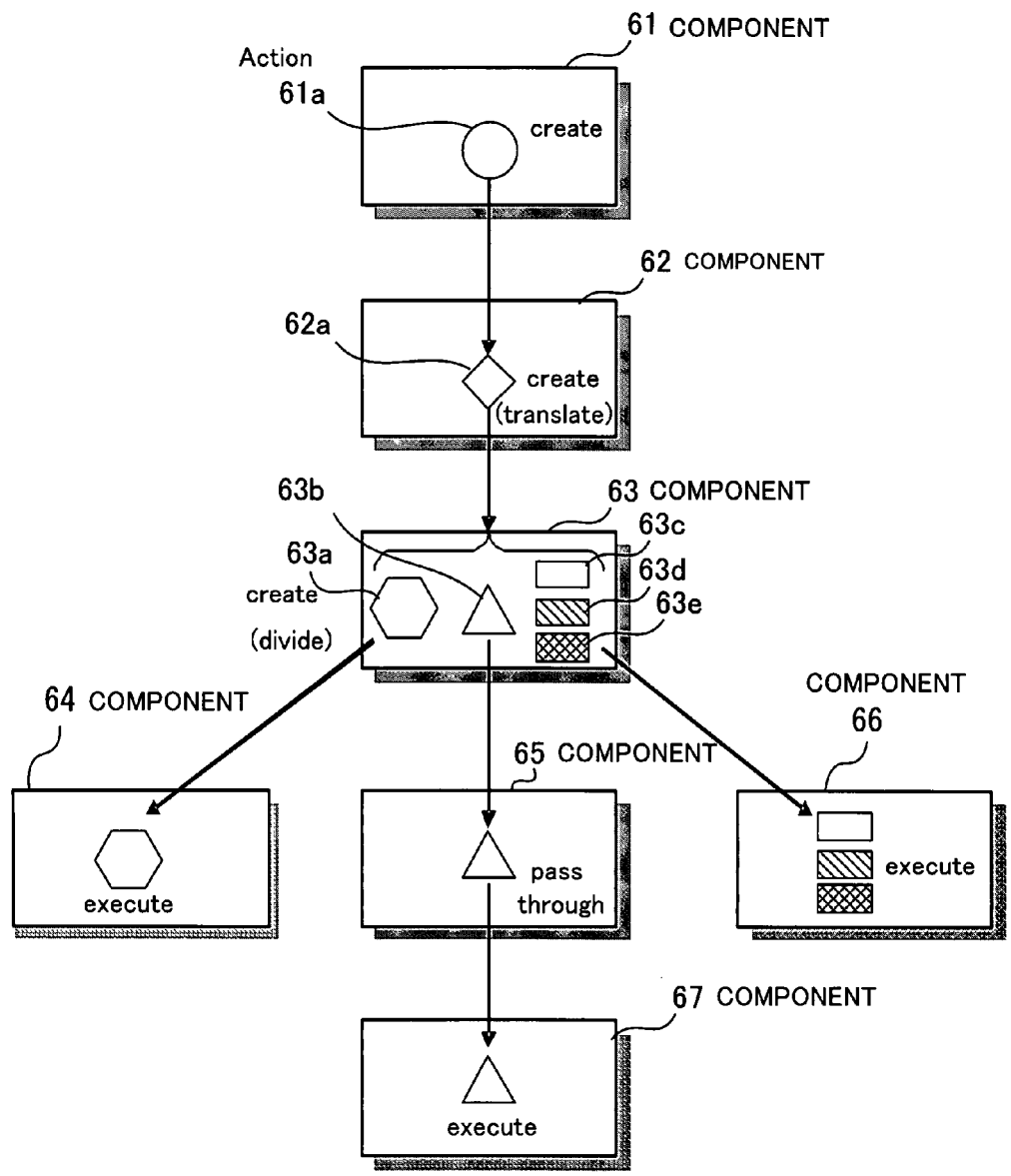
FIG. 11 is a diagram indicating a concept of propagation of action requests.

FIG. 11 is a diagram indicating a concept of propagation of action requests. In FIG. 11, seven components 61 to 67 are illustrated. Each of the components 61 to 67 is a resource manager or an agent which operates on a resource. In addition, each of the actions 61a, 62a, 63a, 63b, 63c, 63d, and 63e is produced in one of the components 61 to 67 in which the symbol of the action is indicated in FIG. 11, or transferred from another component to the component in which the symbol of the action is indicated in FIG. 11. In FIG. 11, the symbols having an identical shape and hatching correspond to an identical action.

In FIG. 11, an action request of the action 61a produced by the component 61 is first transferred to the component 62, and is then transformed into another action request. Specifically, a new action 62a is produced by calling an action handler corresponding to the received action request, where the action handler is registered in advance in an action-handler table in the component 62. The transformation of the received action request into another action request is performed in the following two cases.

In the first case, all or part of processing requested by the received action request is not completed after processing is performed by the component 62 in accordance with the received action request, so that it is necessary to request another component to perform the remaining portion of the processing requested by the received action request. In the second case, the component 62 modifies the received action request into a more appropriate and specific action request, and transfers the modified action request to another component.

Next, the action request modified by the component 62 is sent to the component 63. The component 63 produces the plurality of actions 63a, 63b, 63c, 63d, and 63e. An action request for the action 63a is outputted to the component 64, an action request for the action 63b is outputted to the component 65, and an action request for the actions 63c, 63d, and 63e is outputted to the components 66.

As indicated above, a component may output a plurality of action requests to a plurality of other components (e.g., to the components 64 to 66). In some cases (e.g., in the case where a plurality of operations are required to be sequentially performed), a component may output an action request for a plurality of actions (e.g., the action request for the actions 63c, 63d, and 63e) to a single other component. In the case where the component 63 sends the action request for the plurality of actions 63c, 63d, and 63e to the single component 66, the order of the actions 63c, 63d, and 63e is designated, and the plurality of actions 63c, 63d, and 63e are brought together into a single action group and contained in the single action request.

The component 64 executes the action 63a (produced by the component 63) in response to the action request for the action 63a.

The action 63b produced by the component 63 is transferred, as it is, to the component 67 through the component 65. For example, assume that the component 63 is a system RM (i.e., a resource manager which manages the entire system), the component 65 is a server RM (which manages a group of servers), and the component 67 is an agent (which operates on a server).

In this case, although the system RM recognizes that the action 63b relates to a server, the system RM is not required to actually know which server is related to the action 63b, or where the server is located. That is, the system RM simply transfers the action 63a to the server RM, which manages all the servers, so that the server RM transfers the action 63a to the agent which actually executes the action 63a. That is, the action is transferred to the target agent.

However, the server RM does not simply transfer the action request, as it is, to the subordinate agent. The server RM sends the action request to the agent after changing at least the sender information to the server RM. The sender information is changed in order to ensure traceability in the transmission of the action as explained later.

The action 61a produced in the component 61 is divided into various actions so that the action 61a is finally reflected in the components 64, 66, and 67. Since the system is configured as above, each component is not required to know the locations of all the other components.

For example, in the configuration as illustrated in FIG. 4, only the server RM 121 is required to know all the servers in the site 100, and it is sufficient for the system RM 111 to know that the server RM 121 manages all the servers in the site 100 in a unified manner. Likewise, the system RM 111 can transfer actions to the network.

On the other hand, it is sufficient for the system RM 211 in the site 200 to know the existence of the system RM 111 and be able to communicate with the system RM 111, where the system RM 111 manages the entire site 100. Therefore, when the system RM 211 transfers to the system RM 111 all the action requests related to the resources in the site 100, the actions can be transferred through appropriate resource managers, so that the designated actions can be executed.

When the storage RM 221 outputs an action request to a resource in the site 100, the storage RM 221 can delegate the system RM 211 to transfer the action request, which is at a higher level than the storage RM 221. Thereafter, the action request is transferred as explained above. That is, it is unnecessary for the storage RM 221 to care about the configuration of the resource managers in the other site.

As understood from the above explanations, FIG. 11 indicates propagation of all the actions related to the action 61a. Since each component has a database for holding a log of actions in the system according to the present embodiment, it is possible to readily obtain the relationships between the components with respect to propagation of actions, so that the traceability can be ensured. Thus, it is possible to acquire all actions related to an arbitrary action after an action request is issued, or cancel the issued request.

FIG. 12 is a diagram illustrating an example of a data structure of a log DB. The log DB 103 has the fields of the operation type and the log information.

In the filed of the operation type, the type of the operation performed by a component. For example, the filed of the operation type includes "Action Request Production," "Action Request Transmission," "Action Request Receipt," and "Action Execution."

Information related to details of the operations of the component is registered in the filed of the log information. For example, when an action request is produced, all the details of the produced action request are held. At this time, in the case where the action request is produced by execution of an action according to a preceding action request, the request ID of the preceding action request is also recorded. When an action request is transmitted, the request ID and the destination of the transmitted action request are recorded. When an action request is received, the request ID and the sender of the received action request are recorded. When an action is executed, the request ID and the sender of the action request and the action ID of the executed action are recorded.

Since basically all the details of each action request transmitted from and received by the component are held, the action propagation diagram as FIG. 11 can be obtained by tracing the Creator element 42, the Sender element 43, and the destinations and the sources in the log information. In addition, it is also possible to recognize the command or script executed by each component, by referring to the action-handler table in each component.

Next, examples of actions for managing the system according to the present embodiment are explained in detail, where it is assumed that the system initially provides a web service by using the storage device 230 in the site 200 and the server computer 150 in the site 100 without the aid of the server computer 140, and a VLAN (Virtual Local Area Network) is set by the network device 160 (e.g., switches) for the web service in order to prevent the influence on the other resources.

In the following explanations, as a concrete example of a sequence of operations of the system according to the present embodiment, a sequence of operations performed after the system RM 211 detects that the server processing capacity is insufficient to fully utilize the storage capacity is explained. Specifically, in the sequence of operations, the system RM 211 instructs to add the server functions of the server 140 for the web service. It is also assumed that each of the system RM 111 in the site 100 and the system RM 211 in the site 200 does not recognize the resource managers in the other site although the system RM 111 and the system RM 211 recognize each other. Further, although the system RM 211 issues an explicit instruction to add the server functions of the specific server 140 in the following explanations, alternatively, it is possible to delegate another resource manager (e.g., the system RM 111 or the server RM 121) to determine which server is to be added.

In the above sequence of operations, the action-handler tables 111a, 121a, 131a, and 141a in the management-server computers 110, 120, and 130 and the server computer 140 are referred to. Before the explanation of the sequence of operations, details of the action-handler tables 111a, 121a, 131a, and 141a are explained with reference to FIGS. 13 to 16.

Figure 13:
FIG. 13 is a diagram illustrating an example of an action-handler table stored in a management-server computer which performs centralized management.

FIG. 13 is a diagram illustrating an example of the action-handler table stored in a management-server computer which performs the centralized management. An action handler "svcctl" for the "set" action for service configuration and an action handler "svcctl" for the "get" action for service configuration are set in the action-handler table 111a stored in the management-server computer 110, which performs centralized management. In this example, the same program "svcctl" is designated in the filed "details of execution" for the "set" action and the "get" action. That is, the program "svcctl" executes the "set" action or the "get" action according to a variable which is inputted when the action is executed.

The action-handler table 111a is referred to by the system RM 111.

FIG. 14 is a diagram illustrating an example of the action-handler table stored in the management-server computer which manages the servers. An action handler "powerctl" corresponding to the "set" action for the server power status, an action handler "svrdomainctl.sh" corresponding to the "set" action for server domain configuration, and an action handler "svrdomainctl.sh" corresponding to the "get" action for server domain configuration are set in the action-handler table 121a stored in the management-server computers 120, which manages the servers.

The action-handler table 121a is referred to by the server RM 121.

Figure 15:
FIG. 15 is a diagram illustrating an example of an action-handler table stored in a lower-level management-server computer which manages network devices.

FIG. 15 is a diagram illustrating an example of the action-handler table stored in the lower-level management-server computer which manages the network devices. An action handler "nwctl" corresponding to the "set" action for parameters of the network devices and an action handler "nwctl" corresponding to the "get" action for parameters of the network devices are set in the action-handler table 131a stored in the management-server computer 130, which manages the network devices.

The action-handler table 131a is referred to by the network RM 131.

FIG. 16 is a diagram illustrating an example of an action-handler table stored in a lower-level management-server computer which can provide web services. An action handler "swctl" corresponding to the "set" action for software status and an action handler "swctl" corresponding to the "get" action for the software status are set in the action-handler table 141a stored in the server computer 140, which can provide the web service.

The action-handler table 141a is referred to by the agent 141.

Hereinbelow, a sequence of operations of the system according to the present embodiment for addition of the server is explained step-by-step with reference to FIGS. 17 to 19.

Figure 17:
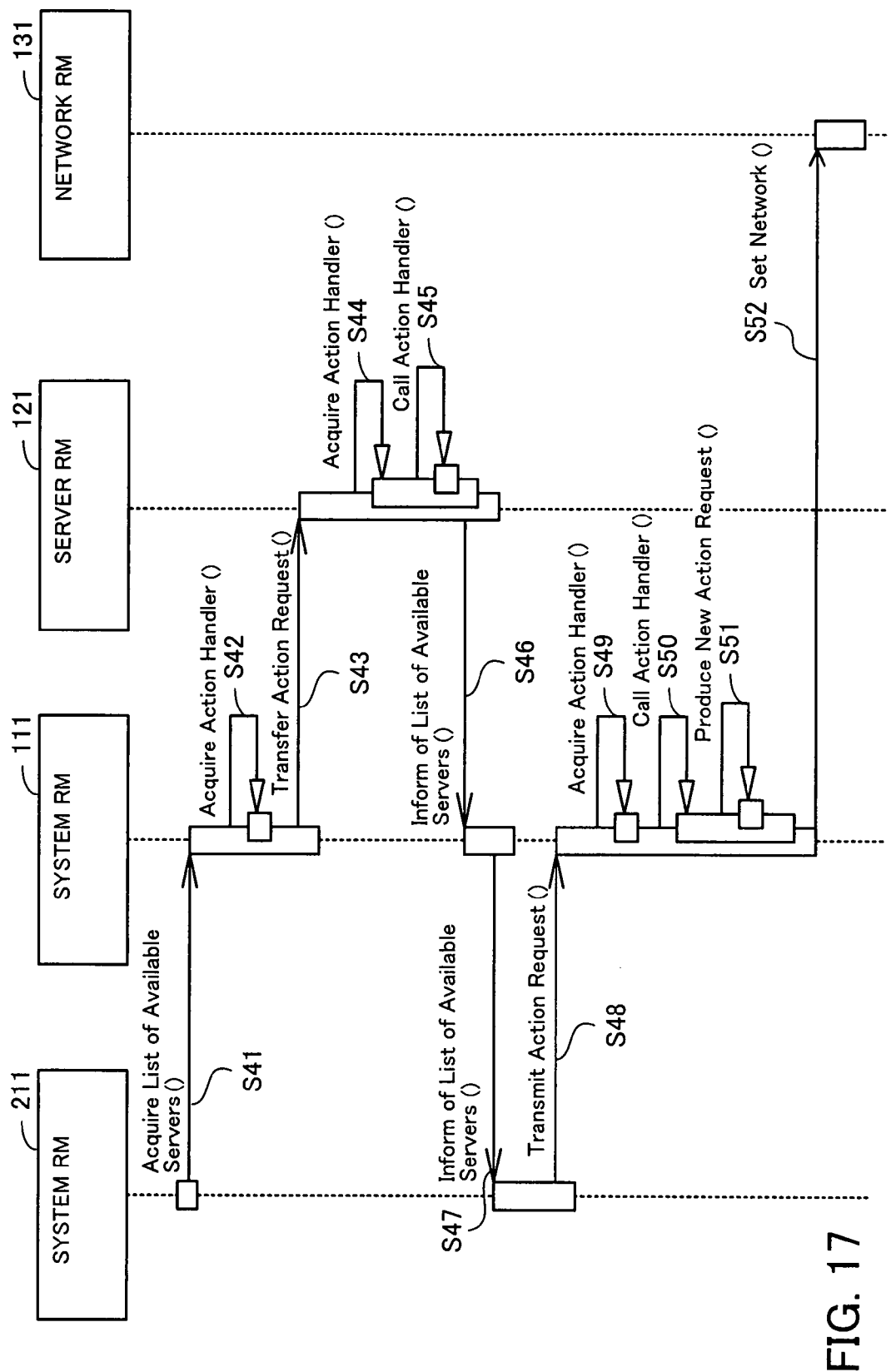
FIG. 17 is a first sequence diagram indicating a sequence of processing for adding a server.

FIG. 17 is a first sequence diagram indicating a sequence of processing for adding a server.

<Step S41>
The system RM 211 produces an action request for acquiring information on one or more available servers, and sends the information to the system RM 111.

<Step S42>
The system RM 111 acquires the action-handler table 111a, and searches for an action designated by the action request.

<Step S43>
In this example, no appropriate example exists. Therefore, the system RM 111 transfers the action request to the server RM 121, which performs server-related management operations.

<Step S44>
When the server RM 121 receives the action request, the server RM 121 acquires the action-handler table 121a, and searches for an action designated by the action request. Thus, the command "svrdomainctl.sh" designating the script name is detected. (See FIG. 14.)

<Step S45>
The server RM 121 calls the corresponding command "svrdomainctl.sh," and acquires server-list information indicating one or more available servers (i.e., one or more server computers which are not currently providing a service) by executing the command "svrdomainctl.sh."

<Step S46>
The server RM 121 sends the acquired server-list information to the system RM 111.

<Step S47>
The system RM 111 transfers to the system RM 211 the server-list information received from the server RM 121.

<Step S48>
The system RM 211 produces an action request for adding the server computer 140 for the service, on the basis of the acquired server-list information, and sends the produced action request to the system RM 111, which manages the entire site 100.

<Step S49>
The system RM 111 acquires the action-handler table 111a, and searches for an action designated by the action request. Thus, the command "svcctl" designating the script name is detected. (See FIG. 13.)

<Step S50>
The system RM 111 calls and executes the action handler "svcctl" obtained by the search.

<Step S51>
The system RM 111 executes processing defined by the action handler "svcctl," and then recognizes the necessity to set the VLAN and start an application on the new server for execution of the designated action. Therefore, the system RM 111 produces an action request for network setting and an action request for server setting, in accordance with definitions in the action handler "svcctl."

<Step S52>
The system RM 111 sends to the network RM 131 the action request for network setting.

Figure 18:
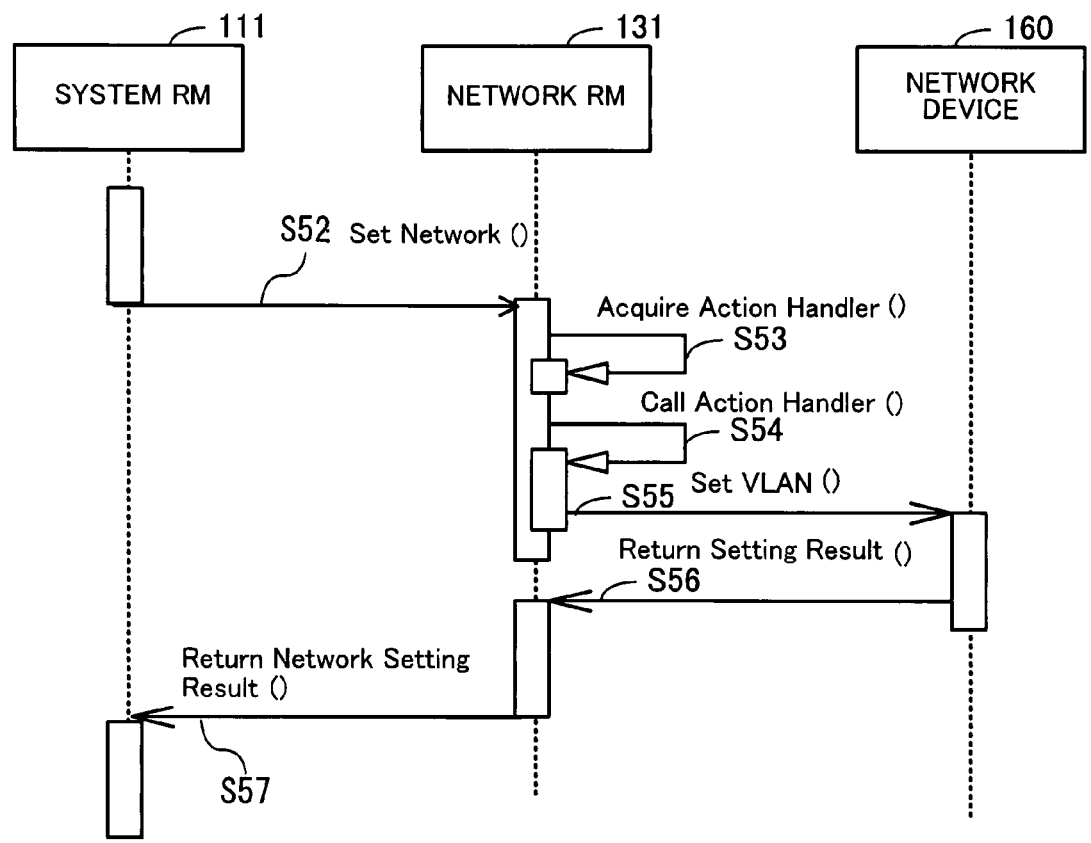
FIG. 18 is a second sequence diagram indicating a sequence of processing for adding the server.

FIG. 18 is a second sequence diagram indicating a sequence of processing for adding the server.

<Step S53>
The network RM 131 acquires the action-handler table 131a, and searches for an action designated by the action request. Thus, the action handler "nwctl" is detected. (See FIG. 15.)

<Step S54>
The network RM 131 executes the set action in accordance with the action handler "nwctl."

<Step S55>
Since no agent exists in the network device 160, the network RM 131 makes settings for the VLAN in the network device 160 in accordance with the action handler by using a standard such as SNMP or an unique protocol.

<Step S56>

The network device 160 returns the result of the execution to the network RM 131.

<Step S57>

The network RM 131 returns to the system RM 111 the result of the settings in the network device 160.

Figure 19:
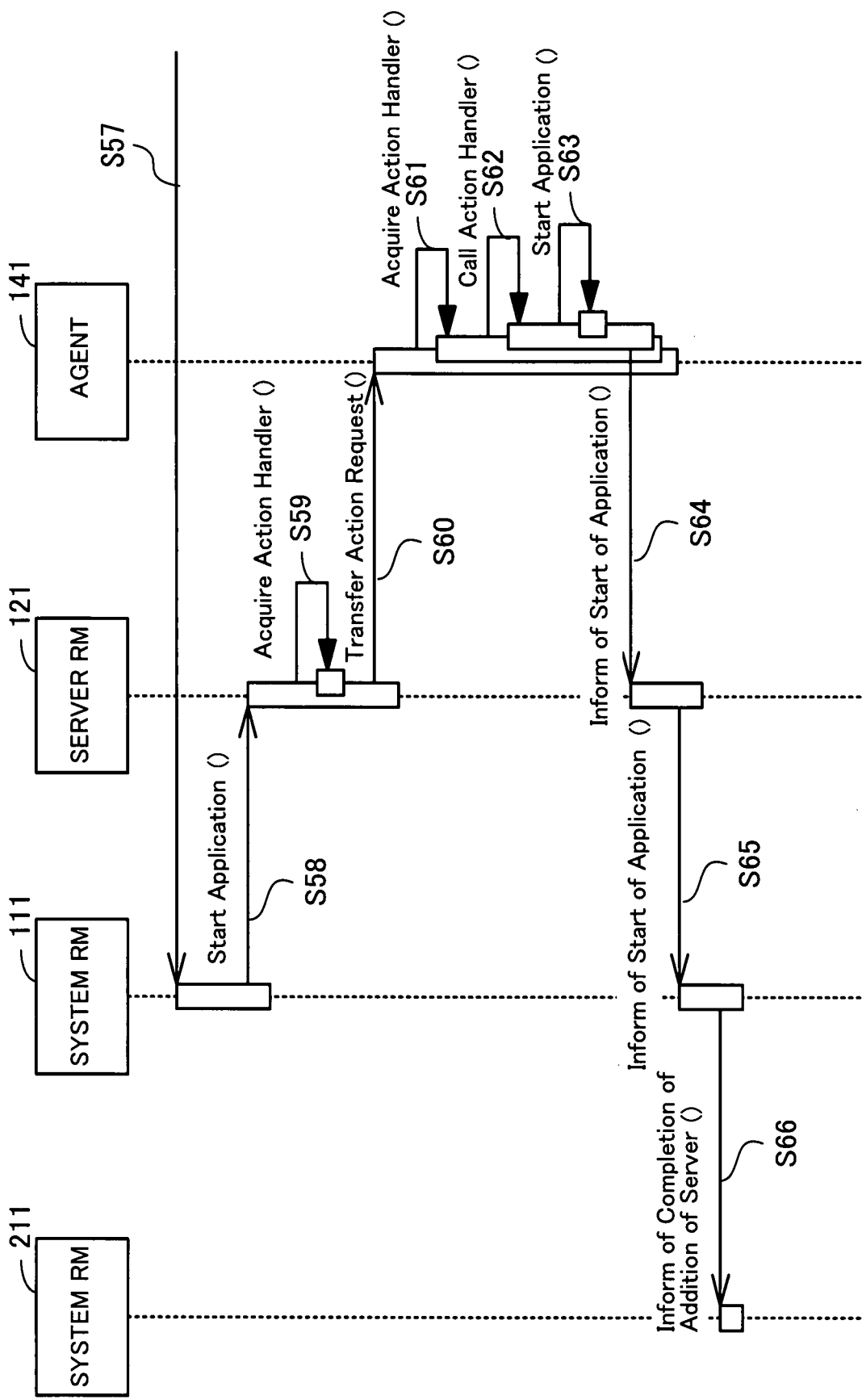
FIG. 19 is a third sequence diagram indicating a sequence of processing for adding the server.

FIG. 19 is a third sequence diagram indicating a sequence of processing for adding the server.

<Step S58>

Since the setting in the network device is completed, the system RM 111 sends to the server RM 121 an action request for starting the application.

<Step S59>

The server RM 121 acquires the action-handler table 121a, and searches for an action designated by the action request. In this case, no appropriate record is detected in the action-handler table 121a.

<Step S60>

The server RM 121 recognizes, on the basis of the Target element 50 (indicated in FIG. 7), that the received action request is for the server computer 140. Therefore, the server RM 121 transfers the action request toward the agent 141 in the server computer 140.

<Step S61>

The agent 141 acquires the action-handler table 141a, and searches for an action designated by the action request. Thus, the action handler "swctl" for the set action is detected. (See FIG. 16.)

<Step S62>

The agent 141 executes the set action in accordance with the action handler "swctl."

<Step S63>

The agent 141 starts the service as an action based on the action handler.

<Step S64>

The agent 141 informs the server RM 121 of the start of the application.

<Step S65>

The server RM 121 informs the system RM 111 of the start of the application.

<Step S66>

The system RM 111 informs the system RM 211 of the start of the application.

As explained above, the web server is added in the system managed in the site 100, in response to the instruction from the system RM 211 in the site 200. Hereinbelow, details of propagation of action requests and concrete examples of the action requests are explained.

In the following explanations, the reference number of each component indicated in FIG. 4 is used in the name for uniquely identifying the component in the system. For example, the system RM 211 is named "systemRM211."

Figure 20:
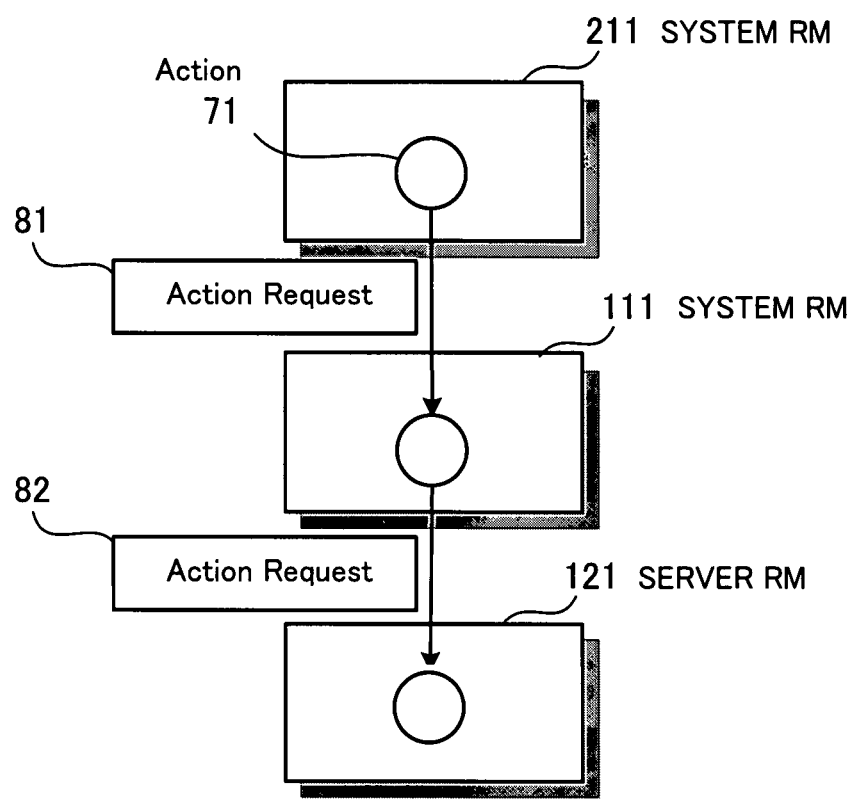
FIG. 20 is a diagram indicating propagation of action requests which occurs during a sequence for acquiring server-configuration information.

FIG. 20 is a diagram indicating propagation of action requests which occurs during a sequence for acquiring information on server configuration. The system RM 211 produces an action 71 for acquiring information on one or more available servers, and then transfers to the system RM 111 an action request 81 for requesting execution of the action 71.

The system RM 111 has no action handler corresponding to details of the execution of the designated action 71 (i.e., no action handler for acquisition of the information on one or more available servers). Therefore, the system RM 111 modifies the action request 81 into an action request 82 by rewriting the description of the sender of the action request 81, and transfers the action request 82 to the server RM 121.

The server RM 121 executes processing corresponding to the action 71 designated by the action request 82 (i.e., processing for acquisition of the information on one or more available servers).

FIG. 21 is a diagram indicating an example of the action request 81 which is first outputted for acquiring the information on server configuration. The action request 81 is described in XML.

In the action request 81, the version of XML is indicated as <?xml version="1.0"?>, the identification information "aql" for the action request and the date and time of the production "2004-08-24T12:00:00" are indicated as <ActionRequest id="aql" createDte="2004-08-24T12:00:00">.

The description <Creator name="systemRM211" id="SysRM2"/> indicates that the action request 81 is produced by the system RM 211, and the description <Sender name="systemRM211" id="SysRM2"/> indicates that the action request 81 is sent from the system RM 211.

The action is defined by the descriptions under the description <!—acquire server-list information on available servers→ as follows.

The description <GetAction id="action 1" sync="false"> indicates that the action is a get action, and the identification information is "action 1."

The description <Target site="Site1" class="ServerDomain" name="ServerPool" id="svcpool"> indicates the site name of the target, the type of the target of the action, and the like.

The description <Structure key="FreeserverList"/> indicates the name of data which is to be obtained as a result of the action.

The action request 81 as explained above is transferred from the system RM 211 to the system RM 111, and the action request 82, which is produced on the basis of the action request 81, is transferred from the system RM 111 to the server RM 121.

FIG. 22 is a diagram indicating an example of the action request 82 transferred from the system RM 111. In the action request 82, the identification information for the action request is changed to "aq2," and the name of the sender is changed to "systemRM111." The description of the action is the same as that of the action request 82.

When the action request 82 as explained above is transferred to the server RM 121, the server-list information on the available servers is produced by the server RM 121, and is then transferred to the system RM 211.

Next, details of propagation of action requests during the processing for adding the server in response to the instruction from the system RM 211 and concrete examples of the action requests are explained below.

Figure 23:
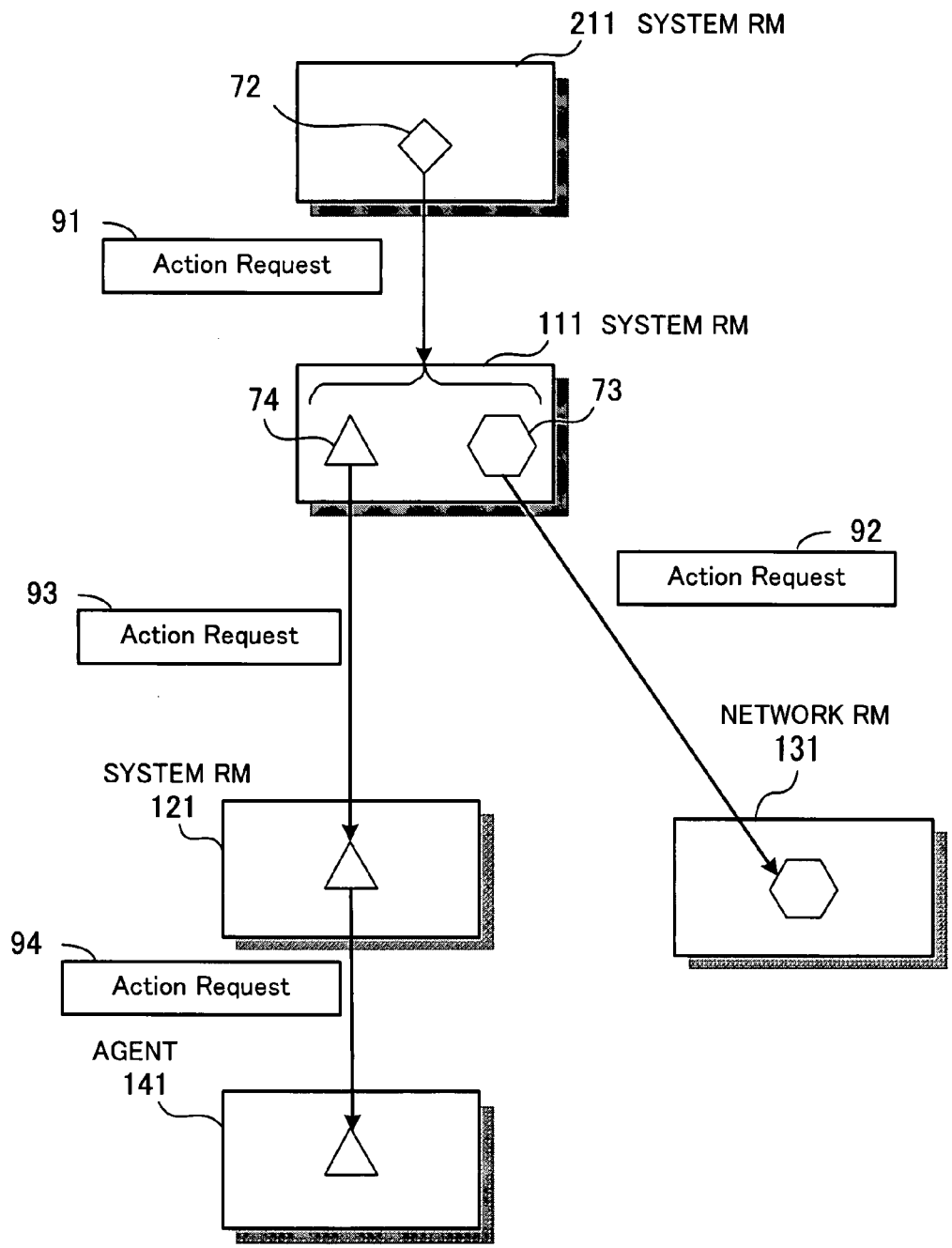
FIG. 23 is a diagram indicating propagation of action requests which occurs during a sequence for adding a server.

FIG. 23 is a diagram indicating propagation of action requests which occurs during a sequence for adding the server computer 140. The system RM 211 produces an action 72 for adding the server computer 140 for the service, and then an action request 91 for requesting execution of the action 72. Thereafter, the system RM 211 transfers the action request 91 to the system RM 111.

The system RM 111 produces an action 73 which is to be transferred to the network RM 131 and an action 74 which is to be transferred to the server RM 121. Then, the system RM 111 produces an action request 92 for requesting execution of the action 73, and transfers the action request 92 to the network RM 131, so that the network RM 131 executes the action 73.

Thereafter, the system RM 111 produces an action request 93 for requesting execution of the action 74, and transfers the action request 93 to the server RM 121. At this time, the server RM 121 confirms that no action handler corresponding to the action 74 is registered in the server RM 121, and transfers to the agent 141 an action request 94 for requesting execution of the action 74. Then, the agent 141 executes the action 74.

FIG. 24 is a diagram indicating an example of the action request 91 which is first outputted for adding the server computer 140. The action request 91 is described in XML. In the action request 91, the name of the system RM 211 is set as both of the name of the creator and the name of the sender, and an action for newly assigning a server to the currently operating service is also set.

The action request 91 as explained above is transferred from the system RM 211 to the system RM 111, and the action request 92, which is produced on the basis of the action request 91, is transferred from the system RM 111 to the network RM 131.

FIG. 25 is a diagram indicating an example of the action request transferred from the system RM. In the action request 92, the name of the system RM 111 is set as both of the name of the creator and the name of the sender. However, as compared with the action request 91, the description of the action is modified into an action for changing the settings for the VLAN in the network device 160.

When the action request 92 as explained above is transferred to the network RM 131, the network RM 131 makes settings in the network device 160 for the VLAN.

Thereafter, an action request 93, which is produced on the basis of the action request 91, is transferred from the system RM 111 to the network RM 131.

FIG. 26 is a diagram indicating an example of the action request 93 transferred from the system RM 111. In the action request 93, the name of the system RM 111 is set as both of the name of the creator and the name of the sender. However, as compared with the action request 91, the description of the action is modified into an action for starting the application in the server computer 140.

The action request 93 as explained above is transferred from the system RM 111 to the server RM 121, and an action request 94, which is produced on the basis of the action request 93, is transferred from the server RM 121 to the agent 141.

FIG. 27 is a diagram indicating an example of the action request 94 transferred from the server RM 121. In the action request 94, the identification information for the action request is changed to "aq5," and the name of the sender is changed to "serverRM121." The description of the action is the same as that of the action request 93.

When the action request 94 as explained above is transferred to the agent 141, the agent 141 performs the processing for starting the application in the server computer 140.

As explained above, it is possible to improve the mutual connectivity between the resource managers, and provide sophisticated management functions. Therefore, the present invention is useful for construction of a resource management system which is functionally advanced, and highly reliable and available.

That is, in the resource management process according to the present embodiment, a common interface is used in communication between a resource manager and an agent operating on a resource, and a designated action can be assigned to a command or script unique to each component by using an action handler prepared for the component. Therefore, the mutual connectivity is remarkably high compared with the conventional systems. Thus, it is possible to automatize the operation of setting each resource manager and each resource, which is conventionally manually performed. Consequently, the resource management operations are facilitated, and the cost is reduced.

In addition, the entire execution history related to actions in each component is recorded as a log. For example, each action request is held in the log DB in the component which produces the action request. Further, the recorded log may contain various information as well as the information indicated in FIG. 12. Thus, it is possible to ensure the traceability of actions, and improve the management functions.

In the example illustrated in FIG. 2, each component is realized in a different server computer. However, it is possible to realize more than one component in a single server computer.

The processing functions according to the present embodiment which are explained above can be realized by computers. In this case, programs describing details of processing for realizing the functions which the management server computers and the server computers should have are provided. When a computer executes one of the above programs, the processing functions of one of the management server computers and the server computers can be realized on the computer.

Each of the programs describing the details of the processing can be stored in a recording medium which can be read by the computer. The recording medium may be a magnetic recording device, an optical disk, an optical magnetic recording medium, a semiconductor memory, or the like. The magnetic recording device may be a hard disk drive (HDD), a flexible disk (FD), a magnetic tape, or the like. The optical disk may be a DVD (Digital Versatile Disk), a DVD-RAM (Random Access Memory), a CD-ROM (Compact Disk Read Only Memory), a CD-R (Recordable)/RW (ReWritable), or the like. The optical magnetic recording medium may be an MO (Magneto-Optical Disk) or the like.

In order to put each of the programs into the market, for example, it is possible to sell a portable recording medium such as a DVD or a CD-ROM in which the program is recorded. Alternatively, it is possible to store the program in a storage device belonging to a server computer, and transfer the program to another computer through a network.

The computer which executes each of the programs stores the program in a storage device belonging to the computer, where the program is originally recorded in, for example, a portable recording medium, or is initially transferred from the server computer. The computer reads the program from the storage device, and performs processing in accordance with the program. Alternatively, the computer may directly read the program from the portable recording medium for performing processing in accordance with the program. Further alternatively, the computer can sequentially execute processing in accordance with each portion of the program every time the portion of the program is transferred from the server computer.

According to the present invention, the processing defined in the action handler corresponding to a request condition is performed in response to the first action request indicating the request condition in the common data form. In the case where all or part of the processing which is requested by the first action request is not performed by the action execution unit, the second action request indicating in the common data form a request condition of all or the part of the requested processing which is not performed by the action execution unit is sent to one of the one or more external resource-managing functions. Since the common data form is used for defining the requested processing, it is possible to realize mutual connection, and uniquely define details of the requested processing by using an action handler. In addition, since the request condition of all or the part of the requested processing which is not performed by the action execution unit is sent to the one of the one or more external resource-managing functions, it is possible to perform the processing corresponding to the first action request in a distributed manner by using a hierarchized resource managers.

The foregoing is considered as illustrative only of the principle of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A computer-readable, non-transitory storage medium which stores a resource management program managing resources by sharing processing loads with one or more external resource-managing functions, the resource management program causing a computer to perform a method comprising:
   storing in a storage unit an action-handler table, in which one or more action handlers corresponding to one or more request conditions respectively are registered, details of at least a portion of processing for each of the one or more request conditions are defined in the corresponding action handler, and said each of the one or more request conditions includes a type of resource on which the processing defined in the corresponding action handler is to be performed and a type of the processing;
   upon receipt of a first action request in which request conditions of requested processing each designating at least a type of resource on which the requested processing is to be performed, a type of the requested processing, and an order of execution of the requested processing are indicated in a common data form that is shared with the one or more external resource-managing functions, analyzing the request conditions included in the first action request, and searching said action-handler table for an action handler corresponding to the type of resource on which the requested processing is to be performed and the type of the requested processing designated in each of the request conditions included in the first action request;
   starting the action handlers detected in said searching in the order designated in the first action request, and performing processing defined in the action handlers detected; and
   in a case where all or part of the processing requested to be performed by the first action request is not performed, producing a second action request indicating a request condition of said all or part of the processing, and transmitting said second action request to one of said one or more external resource-managing functions managing a device on which said all or part of the processing is to be performed.

2. The computer-readable, non-transitory storage medium according to claim 1, the method further comprising:
   acquiring and storing in a log database information contained in said first action request received, details of the processing performed, and information contained in said second action request transmitted.

3. The computer-readable, non-transitory storage medium according to claim 1, the method further comprising:
   transmitting a third action request indicating said request condition indicated in the first action request, to one of said one or more external resource-managing functions which manages a device on which the processing requested by the first action request is to be performed, when no action handler corresponding to the request condition indicated in the first action request is detected.

4. The computer-readable, non-transitory storage medium according to claim 3, the method further comprising:
   acquiring and storing in a log database information contained in said first action request received, details of the processing performed, and information contained in said second action request transmitted or information contained in said third action request transmitted.

5. The computer-readable, non-transitory storage medium according to claim 1, wherein said one or more external resource-managing functions include a resource manager which requests a device having a resource and being managed by the resource manager to perform processing, and an agent which makes environment settings of a resource in response to a request from the resource manager.

6. A resource management process for managing resources by sharing processing loads with one or more external resource-managing functions, the resource management process comprising:
   storing in advance, in a storage unit, an action-handler table, where one or more action handlers corresponding to one or more request conditions respectively are registered in the action-handler table, details of at least a portion of processing for each of the one or more request conditions are defined in the corresponding action handler, and said each of the one or more request conditions includes a type of resource on which the processing defined in the corresponding action handler is to be performed and a type of the processing;
   upon receipt of a first action request in which request conditions of requested processing each designating at least a type of resource on which the requested processing is to be performed, a type of the requested processing, and an order of execution of the requested processing are indicated in a common data form that is shared with the one or more external resource-managing functions, analyzing the request conditions included in the first action request, and searching said action-handler table for an action handler corresponding to the type of resource on which the requested processing is to be performed and the type of the requested processing designated in each of the request conditions included in the first action request;
   starting the action handlers detected in said searching in the order designated in the first action request, and performing processing defined in the action handlers detected; and
   producing a second action request indicating all or part of the processing requested to be performed by the first action request which is not performed, and transmitting said second action request to one of said one or more external resource-managing functions managing a device on which said all or part of the processing is to be performed.

7. A resource management apparatus for managing resources by sharing processing loads with one or more external resource-managing functions, comprising:
   a memory which stores an action-handler table, in which one or more action handlers corresponding to one or more request conditions respectively are registered, details of at least a portion of processing for each of the one or more request conditions are defined in the corresponding action handler, and said each of the one or more request conditions includes a type of resource on which the processing defined in the corresponding action handler is to be performed and a type of the processing;

an action-handler search unit which, upon receipt of a first action request in which request conditions of requested processing each designating at least a type of resource on which the requested processing is to be performed, a type of the requested processing, and an order of execution of the requested processing are indicated in a common data form that is shared with the one or more external resource-managing functions, analyzes the request conditions included in the first action request, and searches said action-handler table for an action handler corresponding to the type of resource on which the requested processing is to be performed and the type of the requested processing designated in each of the request conditions included in the first action request; and an action execution unit which starts the action handlers detected by the action-handler search unit in the order designated in the first action request, and performs processing defined in the action handlers detected by the action-handler search unit, wherein in a case where all or part of the processing requested to be performed by the first action request is not performed by the action execution unit, said action execution unit produces a second action request indicating a request condition of said all or part of the processing, and transmits said second action request to one of said one or more external resource-managing functions managing a device on which said all or part of the processing is to be performed.

8. The resource management apparatus according to claim 7, further comprising a log acquisition unit which acquires and stores in a log database information contained in said first action request received by said action-handler search unit, details of the processing performed by the action execution unit, and information contained in said second action request transmitted by said action execution unit.

* * * * *